(12) United States Patent
Barry et al.

(10) Patent No.: US 6,735,690 B1
(45) Date of Patent: May 11, 2004

(54) SPECIFYING DIFFERENT TYPE GENERALIZED EVENT AND ACTION PAIR IN A PROCESSOR

(75) Inventors: Edwin F. Barry, Cary, NC (US); Patrick R. Marchand, Apex, NC (US); Gerald G. Pechanek, Cary, NC (US); Charles W. Kurak, Jr., Durham, NC (US)

(73) Assignee: PTS Corporation, San Jose, CA (US)

( * ) Notice: Subject to any disclaimer, the term of this patent is extended or adjusted under 35 U.S.C. 154(b) by 586 days.

(21) Appl. No.: 09/598,566

(22) Filed: Jun. 21, 2000

Related U.S. Application Data

(60) Provisional application No. 60/140,245, filed on Jun. 21, 1999.

(51) Int. Cl.⁷ .............................................. G06F 15/00
(52) U.S. Cl. ........................ 712/244; 709/318; 710/267; 710/269; 714/34
(58) Field of Search ........................ 709/318; 710/267, 710/269; 712/244; 714/34

(56) References Cited

U.S. PATENT DOCUMENTS

| | | | | |
|---|---|---|---|---|
| 4,030,072 A | * | 6/1977 | Bjornsson ..................... | 714/31 |
| 5,440,688 A | * | 8/1995 | Nishida ......................... | 714/4 |
| 5,740,413 A |   | 4/1998 | Alpert et al. ................. | 395/568 |
| 6,112,298 A |   | 8/2000 | Deao et al. .................. | 712/227 |
| 6,205,560 B1 | * | 3/2001 | Hervin et al. ................. | 714/34 |
| 6,374,320 B1 | * | 4/2002 | Klein .......................... | 710/260 |

* cited by examiner

Primary Examiner—Kenneth S. Kim
(74) Attorney, Agent, or Firm—Priest & Goldstein,PLLC

(57) ABSTRACT

A processor with a generalized eventpoint architecture, which is scalable for use in a very long instruction word (VLIW) array processor, such as the manifold array (ManArray) processor is described. In one aspect, generalized processor event (p-event) detection facilities are provided by use of compares to check if an instruction address, a data memory address, an instruction, a data value, arithmetic-condition flags, or other processor change of state eventpoint has occurred. In another aspect, generalized processor action (p-action) facilities are provided to cause a change in the program flow by loading the program counter with a new instruction address, generate an interrupt, signal a semaphore, log or count the p-event, time stamp the event, initiate a background operation, or to cause other p-actions to occur. The generalized facilities are defined in the eventpoint architecture as consisting of a control register and three eventpoint parameters, namely at least one register to compare against, a register containing a second compare register, a vector address, or parameter to be passed, and a count or mask register. Based upon this generalized eventpoint architecture, new capabilities are enabled. For example, auto-looping with capabilities to branch out of a nested auto-loop upon detection of a specified condition, background DMA facilities, the ability to link a chain of p-events together for debug purposes, and others are all important capabilities which are readily obtained.

31 Claims, 28 Drawing Sheets

EPLOOPx ENCODING
— 700

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | | S/P | | Ctrl0p | | | | LCF | BPID | 0 | 0 | 0 | 0 | 0 | 0 | 0 | 0 | 0 | 0 | 0 | UDISP10 | | | | | | | | | |

Syntax/Operation
— 710

| Instruction | Operands | Operation |
|---|---|---|
| EPLOOPx | UDISP10 | IEPxR1 ← PC + 1<br>IEPxR0 ← PC + UDISP10<br>IEPx ← 0x18<br>if(IEPxR2.H0>0){<br>  while(IEPxR2.H0>1){<br>    Execute instructions until PC = IEPxR0<br>    PC ← IEPxR1<br>    IEPxR2.H0 ← IEPxR2.H0-1<br>  }<br>  Execute instructions until PC = IEPxR0<br>  IEPxR2.H0 ← IEPxR2.H1<br>}<br>else<br>  PC ← PC + UDISP10 + 1 |

FIG. 3A

SSPR ENCODING — 300

| 31 30 | 29 | 28 | 27 26 25 | 24 | 23 22 | 21 | 20 19 18 17 16 | 15 14 13 12 11 10 | 9 8 7 6 5 4 3 2 1 0 |
|---|---|---|---|---|---|---|---|---|---|
| GROUP | S/P | L/S | 110 | CE1 | SIZE | 0 | Rt | 0 0 0 0 0 0 | SPRADDR |

FIG. 3B

Syntax/Operation — 310

| Instruction | Operands | Operation |
|---|---|---|
| STORE SPECIAL-PURPOSE REGISTER | | |
| SSPR.[SP].W | Rt, SPRADDR | Rt → [SPRADDR]word |
| SSPR.[SP].H0 | Rt, SPRADDR | Rt.H0 → [SPRADDR]hword |
| SSPR.[SP].B0 | Rt, SPRADDR | Rt.B0 → [SPRADDR]byte |
| T.SSPR.[SP].[WH0B0] | Rt, SPRADDR | Do operation only if T condition is satisfied in F0 |

FIG. 4

SPR REGISTER MAP

| SYSTEM ADDRESS FOR SP AS A MCB BUS MASTER (THE NON-SP MCB ADDRESS IS THE SAME EXCEPT WITH ADDRESS BIT 22=1) | SP/PE LSPR/ SSPR ADDRESS | SP REGISTER | PE REGISTER | DESCRIPTION |
|---|---|---|---|---|
| 0x0030080 | 0x0080 | DBSTAT | | Debug Status register |
| 0x0030084 | 0x0084 | DBIR | | Debug Instruction register |
| 0x0030088 | 0x0088 | DBDIN | | Debug Data In register |
| 0x003008c | 0x008c | DBDOUT | | Debug Data Out register |
| 0x0030090 | 0x0090 | | | |
| 0x0030094 | 0x0094 | | | |
| 0x0030098 | 0x0098 | | | |
| 0x003009c | 0x009c | | | |
| 0x00300a0 | 0x00a0 | EPSTAT | EPSTAT | Event Point Status |
| 0x00300a4 | 0x00a4 | DEPCTL0 | DEPCTL0 | Data Event point Control register 0 |
| 0x00300a8 | 0x00a8 | DEPCTL1 | | Data Event point Control register 1 |
| 0x00300ac | 0x00ac | DEP0R0 | DEP0R0 | Data Event point 0 register 0 |
| 0x00300b0 | 0x00b0 | DEP0R1 | DEP0R1 | Data Event point 0 register 1 |
| 0x00300b4 | 0x00b4 | DEP0R2 | DEP0R2 | Data Event point 0 register 2 |
| 0x00300b8 | 0x00b8 | DEP1R0 | | Data Event point 1 register 0 |
| 0x00300bc | 0x00bc | DEP1R1 | | Data Event point 1 register 1 |
| 0x00300c0 | 0x00c0 | DEP1R2 | | Data Event point 1 register 2 |
| 0x00300c4 | 0x00c4 | DEP2R0 | | Data Event point 2 register 0 |
| 0x00300c8 | 0x00c8 | DEP2R1 | | Data Event point 2 register 1 |
| 0x00300cc | 0x00cc | DEP2R2 | | Data Event point 2 register 2 |
| 0x00300d0 | 0x00d0 | IEPCTL0 | | Instruction Event point Control register 0 |
| 0x00300d4 | 0x00d4 | IEPCTL1 | | Instruction Event point Control register 1 |
| 0x00300d8 | 0x00d8 | IEP0R0 | | Instruction Event point 0 register 0 |
| 0x00300dc | 0x00dc | IEP0R1 | | Instruction Event point 0 register 1 |
| 0x00300e0 | 0x00e0 | IEP0R2 | | Instruction Event point 0 register 2 |
| 0x00300e4 | 0x00e4 | IEP1R0 | | Instruction Event point 1 register 0 |
| 0x00300e8 | 0x00e8 | IEP1R1 | | Instruction Event point 1 register 1 |
| 0x00300ec | 0x00ec | IEP1R2 | | Instruction Event point 1 register 2 |
| 0x00300f0 | 0x00f0 | IEP2R0 | | Instruction Event point 2 register 0 |
| 0x00300f4 | 0x00f4 | IEP2R1 | | Instruction Event point 2 register 1 |
| 0x00300f8 | 0x00f8 | IEP2R2 | | Instruction Event point 2 register 2 |
| 0x00300fc | 0x00fc | IEP3R0 | | Instruction Event point 3 register 0 |
| 0x0030100 | 0x0100 | IEP3R1 | | Instruction Event point 3 register 1 |
| 0x0030100 | 0x0104 | IEP3R2 | | Instruction Event point 3 register 2 |
| 0x0030100 | 0x0108 | IEP4R0 | | Instruction Event point 4 register 0 |
| 0x0030100 | 0x010c | IEP4R1 | | Instruction Event point 4 register 1 |
| 0x0030100 | 0x0110 | IEP4R2 | | Instruction Event point 4 register 2 |
| 0x0030100 | 0x0114 | IEP5R0 | | Instruction Event point 5 register 0 |
| 0x0030100 | 0x0118 | IEP5R1 | | Instruction Event point 5 register 1 |
| 0x0030100 | 0x011c | IEP5R2 | | Instruction Event point 5 register 2 |

FIG. 6A

| CONTROL VALUE | OPERATION |
|---|---|
| 00000000 | Disabled Event point. No action<br>OutTrigger ← InTrigger; —— 603 |
| 00T11000<br><br>This may be used for a loop, with loop skip if count is zero.<br>If T==1 InTrigger can be used to exit or skip the loop. | OutTrigger ← InTrigger;            //always pass trigger through —— 605<br><br>if(T==1) —— 606<br>  InTriggerFF ← InTrigger; —— 607<br>else —— 608<br>  InTriggerFF ← 1; —— 609<br><br>WHEN( (PC==IEPxR0\|\|PC==IEPxR1) ) —— 610<br>{<br>  if( (PC==IEPxR1)&&            //if PC matches "start" address — 611<br>    ((T==1&&InTriggerFF==1)\|\|      //trigger is enabled and active — 612<br>    (IEPxR2.H0==0)            //OR 'count' is zero —— 613<br>    )<br>  )<br>  {<br>    PC ← IEPxR0;                //jump to end of loop —— 614<br>    IEPxR2.H0 ← IEPxR2.H1;      //reload count —— 615<br>    InTriggerFF ← 0;            //clear FF —— 616<br>    CancelNext(Inst[PC]);       //Cancel last next fetched inst — 617<br>                                //(last inst of loop)<br>  }<br>  else if(PC==IEPxR0)          //if at "end" address —— 618<br>  {<br>    if(T==1 && InTriggerFF==1)  //if trigger enabled and active — 619<br>    {<br>      PC ← next PC;             //fall out of loop —— 620<br>      IEPxR2.H0 ← IEPxR2.H1;    //reload count —— 621<br>      InTriggerFF ← 0;          //clear FF —— 622<br>    }<br>    else if(IEPxR2.H0==0\|\|IEPxR2.H0==1) —— 623<br>    {<br>      PC ← next PC; —— 624<br>      IEPxR2.H0 ← IEPxR2.H1; —— 625<br>    }<br>    else                        //else Count is neither 1 nor 0 — 626<br>    {<br>      PC ← IEPxR1;              //next PC is [IEPxR1] —— 627<br>      IEPxR2.H0 ← IEPxR2.H0-1;  //decrement "count" —— 628<br>    }<br>  }<br>} |

FIG. 6B

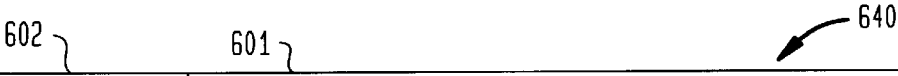

| CONTROL VALUE | OPERATION | |
|---|---|---|
| 00T11001 | OutTrigger ← InTrigger; | //always pass trigger through |
| This is used for a loop which will not skip to the end if the start address is reached and the count is zero. If T==1 Trigger can be used to exit or skip the loop. | if(T==1)<br>  InTriggerFF ← InTrigger;<br>else<br>  InTriggerFF ← 1;<br><br>WHEN( (PC==IEPxR0\|\|PC==IEPxR1) )<br>{<br>if( (PC==IEPxR1)&&<br>    (T==1&&InTriggerFF==1)<br>  )<br>  {<br>    PC ← IEPxR0;<br>    IEPxR2.H0 ← IEPxR2.H1;<br>    InTriggerFF ← 0;<br>    CancelNext(Inst[PC]);<br>  }<br>else if(PC==IEPxR0)<br>  {<br>    if(T==1 && InTriggerFF==1)<br>    {<br>    PC ← next PC;<br>    IEPxR2.H0 ← IEPxR2.H1;<br>    InTriggerFF ← 0;<br>    }<br>    else if(IEPxR2.H0==0\|\|IEPxR2.H0==1)<br>    {<br>    PC ← next PC;<br>    IEPxR2.H0 ← IEPxR2.H1;<br>    }<br>    else<br>    {<br>    PC ← IEPxR1;<br>    IEPxR2.H0 ← IEPxR2.H0-1;<br>    }<br>  }<br>} | //if PC matches "start" address...<br>//trigger is enabled and active<br><br><br>//jump to end of loop<br>//reload count<br>//clear FF<br>//Cancel last next fetched inst<br>//(last inst of loop)<br><br>//if at "end" address<br><br>//if trigger enabled and active<br><br>//fall out of loop<br>//reload count<br>//clear FF<br><br><br><br><br><br><br>//else Count is neither 1 nor 0<br><br>//next PC is [IEPxR1]<br>//decrement "count" |

FIG. 6C

| CONTROL VALUE | OPERATION |
|---|---|
| 00T11010<br><br>This may be used for a loop with an exit based on a TRUE F0 condition or count == 0, or pre-trigger (if enabled). If enabled for pre-trigger, and trigger FF is set, and 'start' address is matched, then the loop is skipped. | ```
OutTrigger ← InTrigger;         //always pass trigger through
if(T==1)
  InTriggerFF ← InTrigger;
else
  InTriggerFF ← 1;

WHEN( (PC==IEPxR0||PC==IEPxR1) )
{
  if( (PC==IEPxR1)&&            //if PC matches 'start' address...
      (T==1&&InTriggerFF==1)    //trigger is enabled and active
    )
  {
    PC ← IEPxR0;                //jump to end of loop
    IEPxR2.H0 ← IEPxR2.H1;      //reload count
    InTriggerFF ← 0;            //clear FF
    CancelNext(Inst[PC]);       //Cancel last next fetched inst
                                //(last inst of loop)
  }
  else if(PC==IEPxR0)   //if at 'end' address
  {
    if(T==1 && InTriggerFF==1)  //if trigger enabled and active
    {
      PC ← next PC;             //fall out of loop
      IEPxR2.H0 ← IEPxR2.H1;    //reload count
      InTriggerFF ← 0;          //clear FF
    }
    else if(IEPxR2.H0==0||IEPxR2.H0==1||F0==1
    {
      PC ← next PC;
      if(IEPxR2.H0==0||IEPxR2.H0==1)
      {
        IEPxR2.H0 ← IEPxR2.H1;
      }
    }
    else                        //else Count is neither 1 nor 0
    {
      PC ← IEPxR1;              //next PC is [IEPxR1]
      IEPxR2.H0 ← IEPxR2.H0-1;  //decrement 'count'
    }
  }
}
``` |

| CONTROL VALUE | OPERATION | |
|---|---|---|
| 00T11011<br><br>This may be used for a loop with an exit based on a FALSE F0 condition or count == 0, or pre-trigger (if enabled). If enabled for pre-trigger, and trigger FF is set, and 'start' address is matched, then the loop is skipped. | `OutTrigger ← InTrigger;`<br><br>`if(T==1)`<br>  `InTriggerFF ← InTrigger;`<br>`else`<br>  `InTriggerFF ← 1;`<br><br>`WHEN( (PC==IEPxR0\|\|PC==IEPxR1) )`<br>`{`<br>  `if( (PC==IEPxR1)`<br>    `(T==1&&InTriggerFF==1)`<br>  `)`<br>  `{`<br>    `PC ← IEPxR0;`<br>    `IEPxR2.H0 ← IEPxR2.H1;`<br>    `InTriggerFF ← 0;`<br>    `CancelNext(Inst[PC]);`<br><br>  `}`<br>`}`<br>`else if(PC==IEPxR0)`<br>`{`<br>  `if(T==1 && InTriggerFF==1)`<br>  `{`<br>    `PC ← next PC;`<br>    `IEPxR2.H0 ← IEPxR2.H1;`<br>    `InTriggerFF ← 0;`<br>  `}`<br>  `else if(IEPxR2.H0==0\|\|IEPxR2.H0==1\|\|F0==0)`<br>  `{`<br>    `PC ← next PC;`<br>    `if(IEPxR2.H0==0\|\|IEPxR2.H0==1)`<br>    `{`<br>      `IEPxR2.H0 ← IEPxR2.H1;`<br>    `}`<br>  `}`<br>  `else`<br>  `{`<br>    `PC ← IEPxR1;`<br>    `IEPxR2.H0 ← IEPxR2.H0-1;`<br>  `}`<br>`}`<br>`}` | //always pass trigger through<br><br><br><br><br><br><br><br>//if PC matches "start" address...<br>//trigger is enabled and active<br><br><br>//jump to end of loop<br>//reload count<br>//clear FF<br>//Cancel last next fetched inst<br>//(last inst of loop)<br><br><br>//if at "end" address<br><br>//if trigger enabled and active<br><br>//fall out of loop<br>//reload count<br>//clear FF<br><br><br><br><br><br><br><br><br><br>//else Count is neither 1 nor 0<br><br>//next PC is [IEPxR1]<br>//decrement "count" |

| CONTROL VALUE | OPERATION |
|---|---|
| SPT00000<br><br>Used for generating an EP interrupt with optional pre-count, and pre-trigger. Interrupt occurs just after instruction at address IEPxR1.<br><br>If SPT=000, then this option becomes the "No operation" control code and no updates to IEP registers occur. | ```
if(P==0)                                    //Default is pass-through
   OutTrigger ← InTrigger;
else                                        //Default is "no trigger"
   OutTrigger ← 0;
if(T==1)
   InTriggerFF ← InTrigger;
else
   InTriggerFF ← 1;

WHEN( (PC==IEPxR0)||(PC==IEPxR1))&&(!T||InTriggerFF) )
{
   if(T && InTriggerFF)
      InTriggerFF ← 0;

if(IEPxR2.H0 == 0)                       //If match with count=0, carry on
   {                                        //(acts as if disabled)
      PC ← next PC;
   }
   else if(IEPxR2.H0 == 1)
   {
      if(S==1)
         EPINT ← 1;                         //assert EP interrupt
      if(P==1)
         OutTrigger ← 1;
      IEPxR2.H0 ← IEPxR2.H1;
   }
   else
   {
      PC ← next PC;
      IEPxR2.H0 ← IEPxR2.H0 - 1;
   }
}
``` |

FIG. 7A

EPLOOPx
ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | | CtrlOp | | | LCF | BPID | | 0 | 0 | 0 | 0 | 0 | 0 | 0 | 0 | 0 | 0 | 0 | 0 | UDISP10 | | | | | | | | | |

Syntax/Operation – 710

| Instruction | Operands | Operation |
|---|---|---|
| EPLOOPx | UDISP10 | IEPxR1 ← PC + 1<br>IEPxR0 ← PC + UDISP10<br>IEPx ← 0x18<br>if(IEPxR2.H0>0){<br>  while(IEPxR2.H0>1){<br>    Execute instructions until PC = IEPxR0<br>    PC ← IEPxR1<br>    IEPxR2.H0 ← IEPxR2.H0-1<br>  }<br>  Execute instructions until PC = IEPxR0<br>  IEPxR2.H0 ← IEPxR2.H1<br>}<br>else<br>  PC ← PC + UDISP10 + 1 |

Syntax/Operation

| Instruction | Operands | Operation |
|---|---|---|
| EPLOOPIx | LoopCnt, UDISP10. | IEPxR1 ← PC + 1<br>IEPxR0 ← PC + UDISP10<br>IEPxR2.H0 ← LoopCnt<br>IEPxR2.H1 ← loopCnt<br>IEPx ← 0x18<br>if(IEPxR2.H0>0){<br>  while(IEPxR2.H0>1){<br>    Execute instructions until PC = IEPxR0<br>    PC ← IEPxR1<br>    IEPxR2.H0 ← IEPxR2.H0 - 1<br>  }<br>  Execute instructions until PC = IEPxR0<br>  IEPxR2.H0 ← IEPxR2.H1<br>}<br>else<br>  PC ← PC + UDISP10 + 1 |

FIG. 8

| Cycle | EP Compare | Fetch | Decode | Execute |
|---|---|---|---|---|
| 0 | | EPLOOPx | Instruction before EPLOOPx | Second instruction before EPLOOPx |
| 1 | | First instruction of Loop | EPLOOPx<br><br>1. Calculate EndA=PC+DISP<br>2. Hold PC and NOP instruction in fetch | Instruction before EPLOOPx |
| 2 | | First instruction of Loop | HW NOP | EPLOOPx<br><br>1. Send EndA to IEPx on SPR bus to be loaded into IEPxR0<br>2. Signal IEPx to load the program counter value into IEPxR1<br>3. Hold PC and NOP instruciton in fetch |
| 3 | First compare of IEPxR0 to PC here. | First instruction of Loop | NOP | HW NOP |
| 4 | | Next instruction | First instruction of Loop | HW NOP |
| 5 | | ⋮ | Next instruction | First instruction of Loop |

FIG. 10A

| CONTROL VALUE | OPERATION |
|---|---|
| SPT01000<br><br>LEA match<br>&& (LDATA<br>& MASK)<br>match after 1<br>occurance then<br>interrupt or<br>OutTrigger | if(P==0)<br>  OutTrigger ← InTrigger; //Default is pass-through<br>else<br>  OutTrigger ← 0;    //Default is "no trigger"<br>if(T==1)<br>  InTriggerFF ← InTrigger;<br>else<br>  InTriggerFF ← 1;<br><br>WHEN((LEA==DEPxR0)&&((LDATA & DEPxR2)==DEPxR1)<br>  && InTriggerFF))<br>{<br>  if(T && InTriggerFF)<br>    InTriggerFF ← 0;  //if qualified event, clear FF<br><br>  if(P==1)<br>    OutTrigger ← 1;   //output 1 cycle pulse<br>  if(S==1)<br>    EPINT ← 1;<br>} |
| SPT01001<br><br>SEA match<br>&& (SDATA<br>& MASK)<br>match after 1<br>occurance then<br>interrupt or<br>OutTrigger | if(P==0)<br>  OutTrigger ← InTrigger; //Default is pass-through<br>else<br>  OutTrigger ← 0;    //Default is "no trigger"<br>if(T==1)<br>  InTriggerFF ← InTrigger;<br>else<br>  InTriggerFF ← 1;<br><br>WHEN((SEA==DEPxR0)&&((SDATA & DEPxR2)==DEPxR1)<br>  && InTriggerFF))<br>{<br>  if(T && InTriggerFF)<br>    InTriggerFF ← 0;  //if qualified event, clear FF<br><br>  if(P==1)<br>    OutTrigger ← 1;   //output 1 cycle pulse<br>  if(S==1)<br>    EPINT ← 1;<br>} |

FIG. 10B

| CONTROL VALUE | OPERATION |
|---|---|
| SPT01010<br><br>(LEA or SEA)<br>match after<br>count<br>occurances<br>then interrupt<br>or OutTrigger | if(P==0)<br>  OutTrigger ← InTrigger; //Default is pass-through<br>else<br>  OutTrigger ← 0;    //Default is "no trigger"<br>if(T==1)<br>  InTriggerFF ← InTrigger;<br>Else<br>  InTriggerFF ← 1;<br>WHEN((LEA==DEPxR0\|\|SEA == DEPxR1)&&(InTriggerFF))<br>{<br>  if(T && InTriggerFF) //If pre-trigger, then clear FF<br>    InTriggerFF ← 0;<br><br>  if(DEPxR2.H0==0)    //If match with count=0, carry on<br>  {        //(acts as if disabled)<br>    PC ← next PC;<br>  }<br>  else if(DEPxR2.H0==1) //if Match with count 1...<br>  {<br>    if(P==1)<br>      OutTrigger ← 1;  //output 1 cycle pulse<br>    if(S==1)<br>      EPINT ← 1;<br>    DEPxR2.H0 ← DEPxR2.H1;    //Reload 'count'<br>  }<br>  else           //If neither 0 or 1...<br>  {<br>    PC ← next PC;<br>    DEPxR2.H0 ← DEPxR2.H0 - 1;  //decrement 'count'<br>  }<br><br>} |

FIG. 10C

| CONTROL VALUE | OPERATION |
|---|---|
| SPT01100<br><br>(LEA THEN SEA) match after count occurances then interrupt or OutTrigger | `if(P==0)`<br>  `OutTrigger ← InTrigger; //Default is pass-through`<br>`else`<br>  `OutTrigger ← 0;    //Default is "no trigger"`<br>`if(T==1)`<br>  `InTriggerFF ← InTrigger;`<br>`else`<br>  `InTriggerFF ← 1;`<br>`WHEN( ((LEA==DEPxR0)&&(InTriggerFF))AND THEN(SEA == DEPxR1))`<br>`{`<br>  `if(T && InTriggerFF) //If pre-trigger, then clear FF`<br>    `InTriggerFF ← 0;`<br><br>  `if(DEPxR2.H0==0)    //If match with count 0, carry on`<br>  `{           //(acts as if disabled)`<br>    `PC ← next PC;`<br>  `}`<br>  `else if(DEPxR2.H0==1) //if Match with count 1...`<br>  `{`<br>    `if(P==1)`<br>      `OutTrigger ← 1; //output 1 cycle pulse`<br>    `if(S==1)`<br>      `EPINT ← 1;`<br>    `DEPxR2.H0 ← DEPxR2.H1;   //Reload 'count'`<br>  `}`<br>  `else            //If neither 0 or 1...`<br>  `{`<br>    `PC ← next PC;`<br>    `DEPxR2.H0 ← DEPxR2.H0 - 1 //decrement 'count'`<br>  `}`<br>`}` |

FIG. 10D

| CONTROL VALUE | OPERATION |
|---|---|
| SPT01101<br><br>(SEA THEN LEA) match after count occurances then interrupt or OutTrigger | ```
if(P==0)
  OutTrigger ← InTrigger;  //Default is pass-through
else
  OutTrigger ← 0;     //Default is "no trigger"
if(T==1)
  InTriggerFF ← InTrigger;
else
  InTriggerFF ← 1;
WHEN( ((SEA==DEPxR0)&&(InTriggerFF))AND THEN(LEA == DEPxR1))
{
  if(T && InTriggerFF)  //If pre-trigger, then clear FF
    InTriggerFF ← 0;

if(DEPxR2.H0==0)    //If match with count=0, carry on
  {           //(acts as if disabled)
    PC ← next PC;
  }
  else if(DEPxR2.H0==1) //if Match with count 1...
  {
    if(P==1)
      OutTrigger ← 1;  //output 1 cycle pulse
    if(S==1)
      EPINT ← 1;
    DEPxR2.H0 ← DEPxR2.H1;    //Reload 'count'
  }
  else            //If neither 0 or 1...
  {
    PC ← next PC;
    DEPxR2.H0 ← DEPxR2.H0 - 1 //decrement 'count'
  }
}
``` |

FIG. 10E

| CONTROL VALUE | OPERATION |
|---|---|
| SPT01110<br><br>(LEA THEN LEA) match after count occurances then interrupt or OutTrigger | `if(P==0)`<br>  OutTrigger ← InTrigger; //Default is pass-through<br>else<br>  OutTrigger ← 0;  //Default is "no trigger"<br>`if(T==1)`<br>  InTriggerFF ← InTrigger;<br>else<br>  InTriggerFF ← 1;<br>WHEN( ((LEA==DEPxR0)&&(InTriggerFF))AND THEN(LEA == DEPxR1))<br>{<br>  if(T && InTriggerFF) //If pre-trigger, then clear FF<br>    InTriggerFF ← 0;<br><br>  if(DEPxR2.H0==0)  //If match with count 0, carry on<br>  {  //(acts as if disabled)<br>    PC ← next PC;<br>  }<br>  else if(DEPxR2.H0==1) //if Match with count 1...<br>  {<br>    if(P==1)<br>      OutTrigger ← 1;  //output 1 cycle pulse<br>    if(S==1)<br>      EPINT ← 1;<br>    DEPxR2.H0   DEPxR2.H1;  //Reload 'count'<br>  }<br>  else  //If neither 0 or 1...<br>  {<br>    PC ← next PC;<br>    DEPxR2.H0 ← DEPxR2.H0 - 1  //decrement 'count'<br>  }<br>} |

FIG. 10F

| CONTROL VALUE | OPERATION |
|---|---|
| SPT01111<br><br>(SEA THEN SEA) match after count occurances then interrupt or OutTrigger | ```
if(P==0)
  OutTrigger ← InTrigger; //Default is pass-through
else
  OutTrigger ← 0;    //Default is 'no trigger'
if(T==1)
  InTriggerFF ← InTrigger;
else
  InTriggerFF ← 1;
WHEN( ((SEA==DEPxR0)&&(InTriggerFF))AND THEN(SEA == DEPxR1))
{
  if(T && InTriggerFF) //If pre-trigger, then clear FF
    InTriggerFF ← 0;

if(DEPxR2.H0==0)    //If match with count 0, carry on
  {                   //(acts as if disabled)
    PC ← next PC;
  }
  else if(DEPxR2.H0==1) //if Match with count 1...
  {
    if(P==1)
      OutTrigger ← 1;  //output 1 cycle pulse
    if(S==1)
      EPINT ← 1;
    DEPxR2.H0 ← DEPxR2.H1;    //Reload 'count'
  }
  else            //If neither 0 or 1...
  {
    PC ← next PC;
    DEPxR2.H0 ← DEPxR2.H0 - 1 //decrement 'count'
  }
}
``` |

FIG. 10G

| CONTROL VALUE | OPERATION |
|---|---|
| SPT10000<br><br>LDATA &<br>MASK match<br>after 1<br>occurances<br>capture address<br>then interrupt<br>and/or<br>OutTrigger.<br>Once the<br>address is held<br>in DEPxR0, it<br>remains held<br>until the<br>control value<br>changes or a<br>store to<br>DEPxR0<br>occurs. | ```
if(P==0)
  OutTrigger ← InTrigger; //Default is pass-through
else
  OutTrigger ← 0;   //Default is "no trigger"
if(T==1)
  InTriggerFF ← InTrigger;
else
  InTriggerFF ← 1;

DEPxR0 ← LEA;     //save address where data detected

WHEN((LDATA & DEPxR2) == DEPxR1
   && InTriggerFF)
{
  if(T && InTriggerFF)
    InTriggerFF ← 0;  //if qualified event, clear FF Hold(DEPxR0);    //Retain state of DEPxR0 (LEA)

if(P==1)
    OutTrigger ← 1;  //output 1 cycle pulse
  if(S==1)
    EPINT ← 1;

| CONTROL VALUE | OPERATION |
|---|---|
| SPT10001<br><br>SDATA &<br>MASK match<br>after 1<br>occurances<br>capture address<br>then interrupt<br>and/or<br>OutTrigger.<br>Once the<br>address is held<br>in DEPxR0, it<br>remains held<br>until the<br>control value<br>changes or a<br>store to<br>DEPxR0<br>occurs. | ```
if(P==0)
  OutTrigger ← InTrigger;  //Default is pass-through
else
  OutTrigger ← 0;     //Default is "no trigger"
if(T==1)
  InTriggerFF ← InTrigger;
else
  InTriggerFF ← 1;

DEPxR0 ← SEA;       //save address where data detected

WHEN((SDATA & DEPxR2) == DEPxR1
   && InTriggerFF)
{
  if(T && InTriggerFF)
    InTriggerFF ← 0;  //if qualified event, clear FF Hold(DEPxR0);       //Retain state of DEPxR0 (SEA)
  if(P==1)
    OutTrigger ← 1;  //output 1 cycle pulse
  if(S==1)
    EPINT ← 1;

| CONTROL VALUE | OPERATION |
|---|---|
| SPT10010<br><br>LEA & Mask match.<br><br>'T' bit used to specify special actions.<br><br>When T==1, count reg treated as a semaphore which can respond to a DMA write address match. A DMA Write with an address that matches LEA & Mask causes inc of count, while a processor (SP/PE) match event causes dec of count and an EXTOUT pulse.<br>If count==0 when match occurs, no decrement of count occurs and no EXTOUT pulse (basically no action). | ```
if(P==0)
  OutTrigger ← InTrigger;  //Default is pass-through
else
  OutTrigger ← 0;     //Default is "no trigger" to output InTriggerFF ← 1;     //Always enable event point for this code //Check for DMA access to increment count
if(T==1)
  if((DMA Write Addr & DEPxR1)==(LEA & DEPxR1) //compare after DMA mux
    DEPxR2.H0 = DEPxR2.H0+1;        //increment count //Check for SP/PE access
if((DEPxR0 & DEPxR1)==(LEA & DEPxR1) && InTriggerFF)
{
  if(DEPxR2.H0==0)    //If match with count=0, carry on
  {                   //(acts as if disabled)
    //do nothing
  }
  else
  {
    if(S==1 && P==1)
      OutTrigger ← 1; //Signal on OutTrigger if(T==0)          //if not using DMA signaling...
    {
      if(DEPxR2.H0 == 1)    // check for count reload
      {
        DEPxR2.H0 ← DEPxR2.H1; // reload count
        if(S==1 && P==0))
          EPINT ← 1;  //if debug int selected, pulse signal
      }
      else
        DEPxR2.H0 = DEPxR2.H0 -1;  //decrement count
    }
    else        //else Using DMA signaling...
    {
      EXTOUT ← 1;  Pulse external output 1 cycle
      DEPxR2.H0 = DEPxR2.H0 -1;  //decrement count
    }

| CONTROL VALUE | OPERATION |
|---|---|
| SPT10011<br><br>SEA & Mask match.<br><br>'T' bit used to specify special actions.<br><br>When T==1, count reg treated as a semaphore which can respond to a DMA write address match. A DMA Read with an address that matches SEA & Mask causes inc of count, while a processor (SP/PE) match event causes dec of count and an EXTOUT pulse. If count==0 when match occurs, no decrement of count occurs and no EXTOUT pulse (basically no action). | `if(P==0)`<br>  `OutTrigger ← InTrigger;` //Default is pass-through<br>`else`<br>  `OutTrigger ← 0;` //Default is "no trigger" to output<br><br>`InTriggerFF ← 1;` //Always enable event point for this code<br><br>//Check for DMA access to increment count<br>`if(T==1)`<br>  `if((DMA Read Addr & DEPxR1)==(SEA & DEPxR1)` //compare after DMA mux<br>    `DEPxR2.H0 = DEPxR2.H0+1;` //increment count<br><br>//Check for SP/PE access<br>`if((DEPxR0 & DEPxR1)==(LEA & DEPxR1) && InTriggerFF)`<br>`{`<br>  `if(DEPxR2.H0==0)` //If match with count=0, carry on<br>  `{` //(acts as if disabled)<br>    //do nothing<br>  `}`<br>  `else`<br>  `{`<br>    `if(S==1 && P==1)`<br>      `OutTrigger ← 1;` //Signal on OutTrigger<br><br>    `if(T==0)` //if not using DMA signaling...<br>    `{`<br>      `if(DEPxR2.H0 == 1)` // check for count reload<br>      `{`<br>    `DEPxR2.H0 ← DEPxR2.H1;` // reload count<br>    `if(S==1 && P==0))`<br>      `EPINT ← 1;` //if debug int selected, pulse signal<br>    `}`<br>    `else`<br>      `DEPxR2.H0 = DEPxR2.H0 -1;` //decrement count<br>    `}`<br>    `else` //else Using DMA signaling...<br>    `{`<br>      `EXTOUT ← 1;` Pulse external output 1 cycle<br>      `DEPxR2.H0 = DEPxR2.H0 -1;` //decrement count<br>    `}`<br>  `}`<br>`}` |

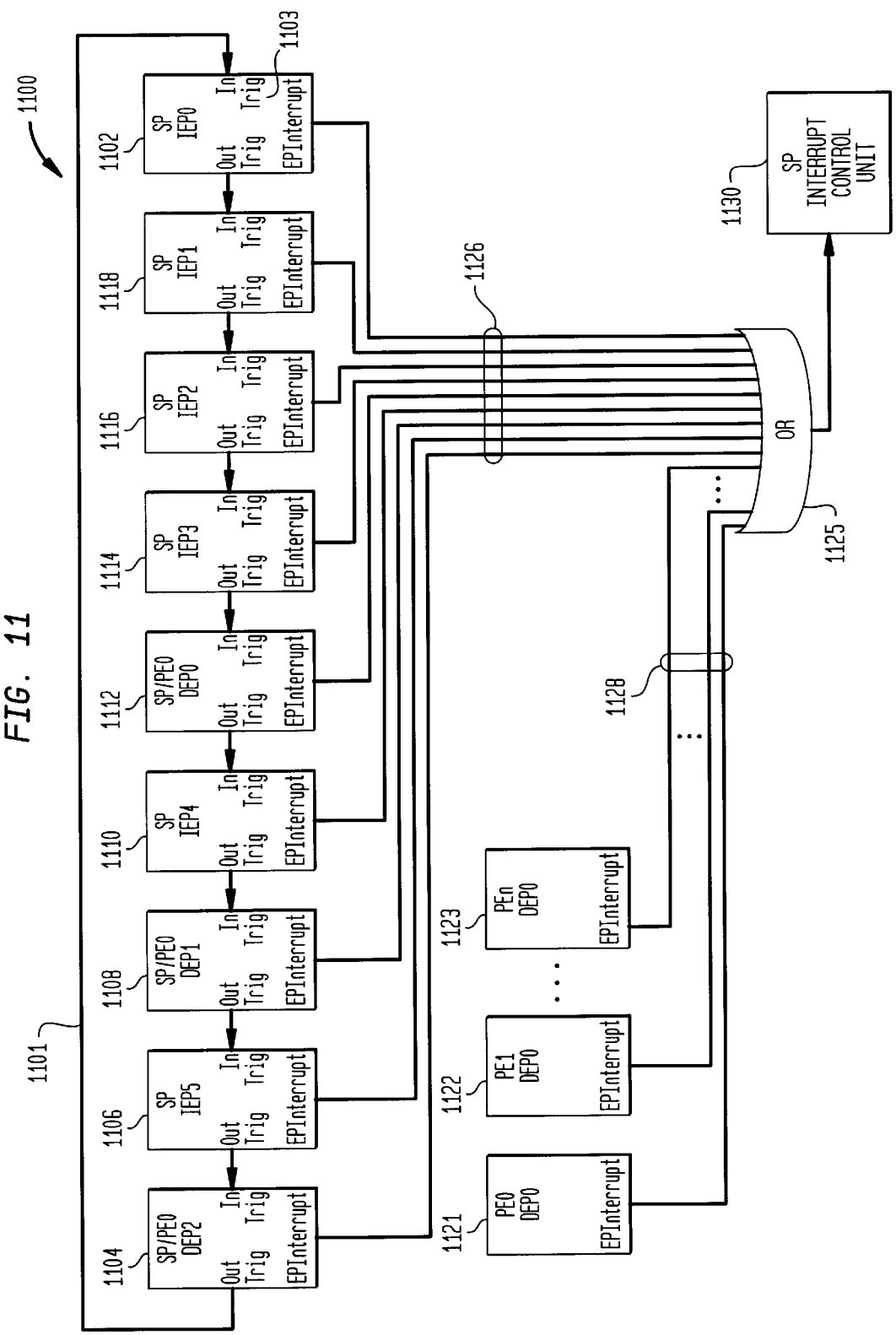

# SPECIFYING DIFFERENT TYPE GENERALIZED EVENT AND ACTION PAIR IN A PROCESSOR

RELATED APPLICATIONS

The present invention claims the benefit of U.S. Provisional Application Serial No. 60/140,245 entitled "Methods and Apparatus for Generalized Event Detection and Action Specification in a Processor" and filed Jun. 21, 1999 which is incorporated by reference herein in its entirety.

FIELD OF THE INVENTION

The present invention relates generally to improved techniques for processor event detection and action specification using a generalized mechanism.

BACKGROUND OF THE INVENTION

A processor event or p-event may be defined as some change of state that it is desirable to recognize. The acknowledgement of a processor event may be termed a processor action or p-action. The purpose of the event-action mechanism, or eventpoint, is to synchronize various actions with specific program and/or data flow events within the processor. Examples of eventpoints which may be encountered include reaching a specified instruction address, finding a specific data value during a memory transfer, noting the occurrence of a particular change in the arithmetic condition flags, accessing a particular memory location, etc. Eventpoints can also include a linked sequence of individual eventpoints, termed chaining, such as finding a specific data value after reaching a specified instruction address, or reaching a second specified instruction address after reaching a first specified instruction address. The p-actions can include changing the sequential flow of instructions, i.e., vectoring to a new address, causing an interrupt, logging or counting an event, time stamping an event, initiating background operations such as direct memory access (DMA), caching prefetch operations, or the like.

In previous approaches, each p-event and its consequent p-action typically was treated uniquely and separately from other specific event-actions in order to solve some special problem. One of the many new contributions the architecture of the present invention provides is a generalized eventpoint mechanism. A requirement of the traditional sequential model of computation is that the processor efficiently handle the programming constructs that affect the sequential flow of instructions to be executed on the processor. In the prior art, one of these programming constructs is an auto-looping mechanism, which is found on many digital signal processors (DSPs). Auto-looping is employed to change the program flow for repetitive loops without the need for branch instructions, thereby improving the performance of programs that use loops frequently. Nested loops have also been supported in the prior art.

It has also been found imperative that a processor support facilities to debug a program. In the prior art, the capability of setting breakpoints on instructions, data, or addresses that cause a branch to a specified target address or cause an interrupt has been developed. The interrupt or debug branch directs the program flow to a special program that provides debug operations to aid the programmer in developing their software.

In another example, it has also been found imperative that a processor support facilities for initiating a DMA operation to occur in the background of normal program execution. In the past, the background DMA capability was typically initiated by specific DMA instructions or instructions specialized for DMA by nature of the side effect that they cause.

Consequently, auto-looping, background DMA operation, debug breakpoint capability, and other unique p-events and their consequent p-actions, represent approaches that have been considered separately in the prior art. The present invention generalizes these functions and provides additional unique capabilities that arise due to the generalization of the various p-events and p-actions in a common architecture thereby providing a common design and program approach to the development and use of all of these types of functions.

SUMMARY OF THE PRESENT INVENTION

The present invention addresses the need to provide a processor with a generalized p-event and p-action architecture which is scalable for use in a very long instruction word (VLIW) array processor, such as the ManArray processor. In one aspect of the invention, generalized p-event detection facilities are provided by use of a compare performed to discover if an instruction address, a data memory address, an instruction, a data value, arithmetic-condition flags, and/or other processor change of state eventpoint has occurred. In another aspect of this invention, generalized p-action facilities are provided to cause a change in the program flow by loading the program counter with a new instruction address, generating an interrupt, generating a log, counting the p-event, passing a parameter, etc. The generalized facilities may be advantageously defined in the eventpoint architecture as consisting of a control register and three eventpoint parameters: 1) a register to compare against, 2) a register containing a second compare parameter, vector address, or parameter to be passed, and 3) a count or mask register. Based upon this generalized eventpoint architecture, new capabilities are supported that extend beyond typical prior art capabilities. For example, auto-looping with capabilities to branch out of a nested auto-loop upon detection of a specified condition, background DMA facilities, and the ability to link a chain of p-events together for debug purposes, among others are all new capabilities easily obtained by use of this invention.

A more complete understanding of the present invention, as well as other features and advantages of the invention, will be apparent from the following Detailed Description and the accompanying drawings.

BRIEF DESCRIPTION OF THE DRAWINGS

FIG. 3A illustrates an exemplary store to special purpose register (SSPR) instruction encoding;

FIG. 3B illustrates an exemplary store to special purpose register syntax/operation description;

FIG. 4 illustrates an exemplary placement of eventpoint registers in an special purpose register file (SPRF) in accordance with the present invention;

FIGS. 6A, 6B, 6C, 6D, 6E, 6F, and 6G illustrate exemplary decode and control logic descriptions for instruction eventpoint modules in accordance with the present invention;

FIG. 7A illustrates an exemplary event point loop (EPLOOP) instruction encoding in accordance with the present invention;

FIG. 7B shows a syntax/operation table for the EPLOOP instruction of FIG. 7A;

FIG. 8 illustrates a ManArray pipeline timing diagram for the EPLOOP instruction of FIG. 7A;

FIGS. 10A, 10B, 10C, 10D, 10E, 10F, 10G, 10H, 10I, and 10J illustrate exemplary decode and control logic descriptions for data eventpoint modules in accordance with the present invention;

FIG. 11 illustrates an exemplary eventpoint chaining apparatus in accordance with the present invention.

DETAILED DESCRIPTION

Figure 1:
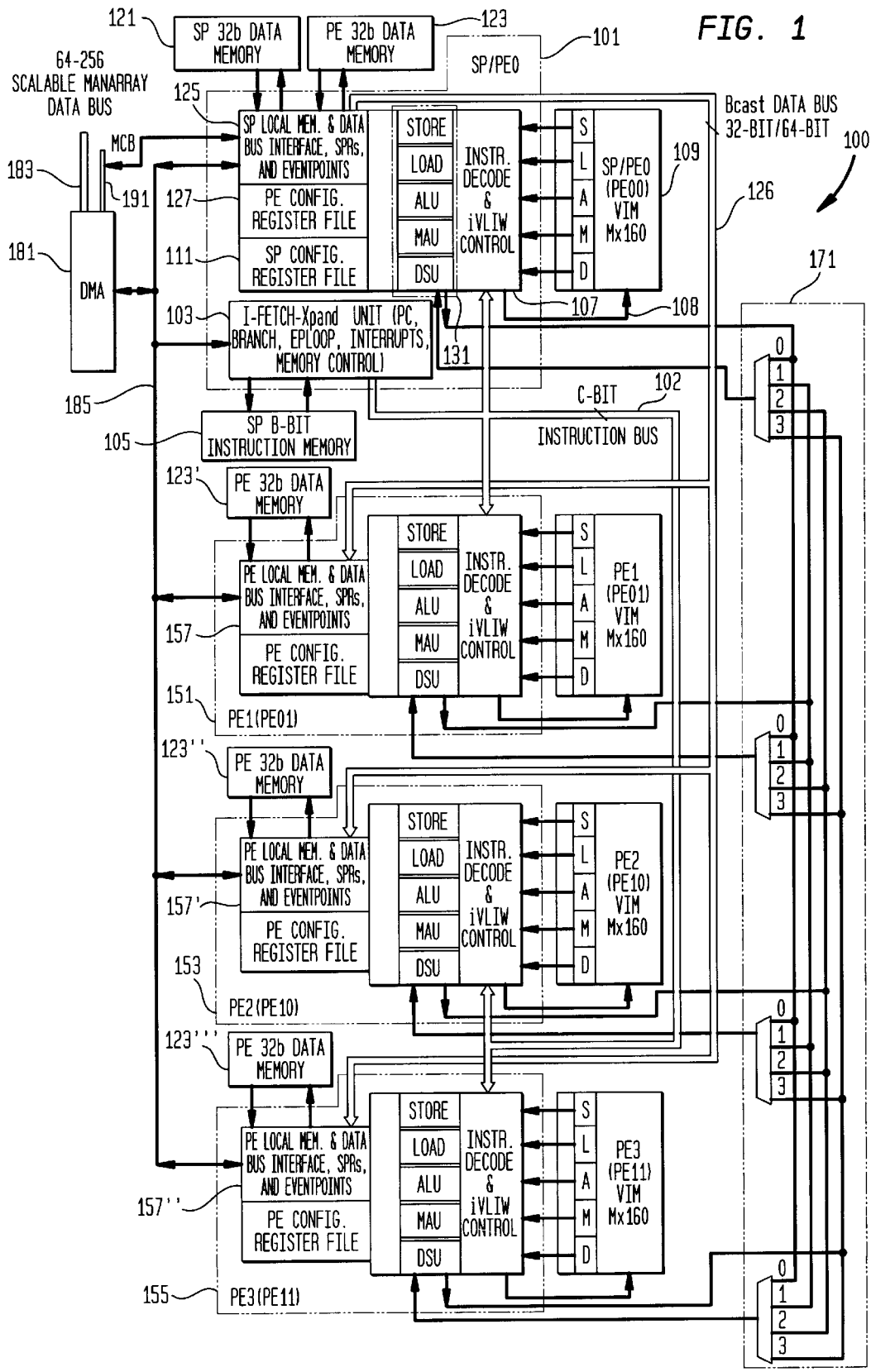
FIG. 1 illustrates an exemplary 2×2 ManArray iVLIW processor suitable for use in conjunction with the present invention.

Further details of a presently preferred ManArray core, architecture, and instructions for use in conjunction with the present invention are found in U.S. patent application Ser. No. 08/885,310 filed Jun. 30, 1997, now U.S. Pat. No. 6,023,753, U.S. patent application Ser. No. 08/949,122 now issued U.S. Pat. No. 6,167,502, filed Oct. 10, 1997, U.S. patent application Ser. No. 09/169,255 filed Oct. 9, 1998, now issued U.S. Pat. No. 6,343,356, U.S. patent application Ser. No. 09/169,256 filed Oct. 9, 1998, now issued U.S. Pat. No. 6,167,501, U.S. patent application Ser. No. 09/169,072 filed Oct. 9, 1998, now issued U.S. Pat. No. 6,219,776, U.S. patent application Ser. No. 09/187,539 filed Nov. 6, 1998, now issued U.S. Pat. No. 6,151,668, U.S. patent application Ser. No. 09/205,588 filed Dec. 4, 1998, now issued U.S. Pat. No. 6,173,389, U.S. patent application Ser. No. 09/215,081 filed Dec. 18, 1998, now issued U.S. Pat. No. 6,101,592, U.S. patent application Ser. No. 09/228,374 filed Jan. 12, 1999, now issued U.S. Pat. No. 6,216,223, and entitled "Methods and Apparatus to Dynamically Reconfigure the Instruction Pipeline of an Indirect Very Long Instruction Word Scalable Processor", U.S. patent application Ser. No. 09/238,446 filed Jan. 28, 1999, now issued U.S. Pat. No. 6,366,999, U.S. patent application Ser. No. 09/267,570 filed Mar. 12, 1999, now issued U.S. Pat. No. 6,446,190, U.S. patent application Ser. No. 09/337,839 filed Jun. 22, 1999, U.S. patent application Ser. No. 09/350,191 filed Jul. 9, 1999, now issued U.S. Pat. No. 6,356,994, U.S. patent application Ser. No. 09/422,015 filed Oct. 21, 1999, now issued U.S. Pat. No. 6,408,382, and entitled "Methods and Apparatus for Abbreviated Instruction and Configurable Processor Architecture", U.S. patent application Ser. No. 09/432,705 filed Nov. 2, 1999 entitled "Methods and Apparatus for Improved Motion Estimation for Video Encoding", U.S. patent application Ser. No. 09/471,217 filed Dec. 23, 1999 entitled "Methods and Apparatus for Providing Data Transfer Control", U.S. patent application Ser. No. 09/472,372 filed Dec. 23, 1999, now issued U.S. Pat. No. 6,256,683, and entitled "Methods and Apparatus for Providing Direct Memory Access Control", U.S. patent application Ser. No. 09/596,103 entitled "Accessing Tables in Memory Banks Using Load and Store Address Generators Sharing Store Read Port of Compute Register File Separated from Address Register File" now U.S. Pat. No. 6,397,324, filed Jun. 16, 2000, U.S. patent application Ser. No. 09/598,567 entitled "Methods and Apparatus for Improved Efficiency in Pipeline Simulation and Emulation" filed Jun. 21, 2000, U.S. patent application Ser. No. 09/598,564 entitled "Methods and Apparatus for Initiating and Resynchronizing Multi-Cycle SIMD Instructions", now U.S. Pat. No. 6,662,234, filed Jun. 21, 2000, U.S. patent application Ser. No. 09/598,558 entitled "Methods and Apparatus for Providing Manifold Array (ManArray) Program Context Switch with Array Reconfiguration Control" filed Jun. 21, 2000, and U.S. patent application Ser. No. 09/598,084 entitled "Methods and Apparatus for Establishing Port Priority Functions in a VLIW Processor" filed Jun. 21, 2000, now issued U.S. Pat. No. 6,654,870, as well as, Provisional Application Serial No. 60/113,637 entitled "Methods and Apparatus for Providing Direct Memory Access (DMA) Engine" filed Dec. 23, 1998, Provisional Application Ser. No. 60/113,555 entitled "Methods and Apparatus Providing Transfer Control" filed Dec. 23, 1998, Provisional Application Serial No. 60/139,946 entitled "Methods and Apparatus for Data Dependent Address Operations and Efficient Variable Length Code Decoding in a VLIW Processor" filed Jun. 18, 1999, Provisional Application Serial No. 60/140,245 entitled "Methods and Apparatus for Generalized Event Detection and Action Specification in a Processor" filed Jun. 21, 1999, Provisional Application Serial No. 60/140,163 entitled "Methods and Apparatus for Improved Efficiency in Pipeline Simulation and Emulation" filed Jun. 21, 1999, Provisional Application Serial No. 60/140,162 entitled "Methods and Apparatus for Initiating and Re-Synchronizing Multi-Cycle SIMD Instructions" filed Jun. 21, 1999, Provisional Application Serial No. 60/140,244 entitled "Methods and Apparatus for Providing One-By-One Manifold Array (1×1 ManArray) Program Context Control" filed Jun. 21, 1999, Provisional Application Serial No. 60/140,325 entitled "Methods and Apparatus for Establishing Port Priority Function in a VLIW Processor" filed Jun. 21, 1999, Provisional Application Serial No. 60/140,425 entitled "Methods and Apparatus for Parallel Processing Utilizing a Manifold Array (ManArray) Architecture and Instruction Syntax" filed Jun. 22, 1999, Provisional Application Serial No. 60/165,337 entitled "Efficient Cosine Transform Implementations on the ManArray Architecture" filed Nov. 12, 1999, and Provisional Application Serial No 60/171,911 entitled "Methods and Apparatus for DMA Loading of Very Long Instruction Word Memory" filed Dec. 23, 1999, Provisional Application Serial No. 60/184,668 entitled "Methods and Apparatus for Providing Bit-Reversal and Multicast Functions Utilizing DMA Controller" filed Feb. 24, 2000, Provisional Application Serial No. 60/184,529 entitled "Methods and Apparatus for Scalable Array Processor Interrupt Detection and Response" filed Feb. 24, 2000, Provisional Application Serial No. 60/184,560 entitled "Methods and Apparatus for Flexible Strength Coprocessing Interface" filed Feb. 24, 2000, Provisional Application Ser. No. 60/203,629 entitled "Methods and Apparatus for Power Control in a Scalable Array of Processor Elements" filed May 12, 2000, and Provisional Application Serial No. 60/121,987 entitled "Methods and Apparatus for Indirect VLIW Memory Allocation" filed Jun. 21, 2000, respectively, all of which are assigned to the assignee of the present invention and incorporated by reference herein in their entirety.

In order to support generalized p-event detection, p-event counting, and p-action flow control or parameter passing, a minimum of two parameters are used with generally three parameters utilized. These three general parameters are defined in the eventpoint architecture as a first register to compare against, a second optional register containing either a second compare parameter, a vector address, or parameter to be passed, and a third register acting as a p-event counter or a mask. To allow flexibility in the control of how these three parameters are used, a control register is employed for each eventpoint set of the three parameters. The control register content specifies the type of comparison that is to be made and defines the action to be taken. For example, an eventpoint can be uniquely identified when a compare match occurs between the first compare register parameter and a specified processor state, or when a chain of eventpoints occurs in some logical or sequential fashion. Some of the possible processor states that can be compared for include an instruction address, a specific instruction, a VLIW Memory (VIM) address, a data memory address, a memory or register file data value, flags, a control register value, and the like. The control register also defines how the eventpoint is to be treated and the p-action that is to occur. Some p-actions make use of the second register parameter. For example, the second register parameter can contain a vector address that is loaded in the program counter upon a p-event detection, thereby directing the program to a debug routine or the beginning of a program loop. Other examples include: starting a background operation at an eventpoint, such as a DMA operation, and using the second parameter register to pass a variable to the DMA hardware, generating an interrupt at the eventpoint and using the second parameter register to pass a variable to the interrupt routine, and the like. Other p-actions include counting the p-event, link to and enable another eventpoint, etc. The determination of whether a p-event is used directly to cause a p-action, or whether multiple occurrences of the same p-event are required before causing a p-action, is made by the control register in conjunction with the third count parameter. The eventpoint counter is tested for a zero state, a one state, or other state indicating it contains some count value. These three states can be tested for at different eventpoints and different p-actions can result. An eventpoint (EP) auto-loop with unique capabilities can be specified as a subset of the capabilities of the present invention. For example, an EP auto-loop can be set up that skips the loop completely if the count is zero at the loop start address, or an auto-loop can be set up that allows a conditional exit from the auto-loop based upon the state of an arithmetic condition flag.

It is noted that depending upon the application, the scope of and requirements for the generalized eventpoint hardware can vary. Consequently, it is desirable to have a standard architectural approach for implementation and programmer use. To demonstrate the apparatus and use of this invention in the context of a presently preferred processor, the next sections describe in detail the incorporation of this generalized eventpoint architecture into the scalable indirect-VLIW ManArray processor.

In a preferred embodiment of the present invention, a ManArray 2×2 iVLIW single instruction multiple data stream (SIMD) processor 100 shown in FIG. 1 contains a controller sequence processor (SP) combined with processing element-0 (PE0) SP/PE0 101, as described in further detail in U.S. application Ser. No. 09/169,072 entitled "Methods and Apparatus for Dynamic Merging an Array Controller with an Array Processing Element". Three additional PEs 151, 153, and 155 are also utilized to demonstrate the generalized processor event detection and action specification architecture and design apparatus for the present invention.

The SP/PE0 101 contains a fetch controller 103 to allow the fetching of short instruction words (SIWs), also known as native instructions, from a B=32-bit instruction memory 105. The fetch controller 103 provides the typical functions needed in a programmable processor, such as a program counter (PC), branch capability, eventpoint (EP) loop control operations, support for interrupts, and also provides the instruction memory control which could include an instruction cache if needed by an application. In addition, the SIW I-Fetch controller 103 dispatches 32-bit SIWs to the other PEs in the system by means of the 32-bit instruction bus 102.

In this exemplary system, common elements are used throughout to simplify the explanation, though actual implementations need not be so limited. For example, the execution units 131 in the combined SP/PE0 101 can be separated into a set of execution units optimized for the control function, for example, fixed point execution units, and the PE0 as well as the other PEs 151, 153 and 155 can be optimized for a floating point application. For the purposes of this description, it is assumed that the execution units 131 are of the same type in the SP/PE0 and the other PEs. In a similar manner SP/PE0 and the other PEs are shown as all using a five instruction slot iVLIW architecture which contains a very long instruction word memory (VIM) 109 and an instruction decode and VIM controller function unit 107 which receives instructions as dispatched from the SP/PE0's I-Fetch unit 103 and generates the VIM addresses-and-control signals 108 required to access the iVLIWs stored in the VIM. Store, load, arithmetic logic unit (ALU), multiply accumulate unit (MAU), and data select unit (DSU) instruction types are identified by the letters SLAMD in VIM 109 as follows; store (S), load (L), ALU (A), MAU (M), and DSU (D). The loading of the iVLIWs is described in further detail in U.S. patent application Ser. No. 09/187, 539 entitled "Methods and Apparatus for Efficient Synchronous MIMD Operations with iVLIW PE-to-PE Communication". Also contained in the SP/PE0 and the other PEs is a common PE configurable register file 127 which is described in further detail in U.S. patent application Ser. No. 09/169,255 entitled "Methods and Apparatus for Dynamic Instruction Controlled Reconfiguration Register File with Extended Precision".

Due to the combined nature of the SP/PE0, the data memory interface controller 125 must handle the data processing needs of both the SP controller, with SP data in memory 121, and PE0, with PE0 data in memory 123. The SP/PE0 controller 125 also is the source of the data that is sent over the 32-bit or 64-bit (depending upon implementation) broadcast data bus 126 and contains a special purpose register file (SPRF) and instruction and data eventpoint modules described in this invention. The other PEs, 151, 153, and 155 contain common physical data memory units 123', 123", and 123''' though the data stored in them is generally different as required by the local processing done on each PE. The interface to these PE data memories is also a common design in PEs 1, 2, and 3 and indicated by PE local memory and data bus interface logic 157, 157' and 157". The interface logic units 157, 157', and 157" also contain the PEs SPRF and data eventpoint modules described further below. Interconnecting the PEs for data transfer communications is the cluster switch 171 more completely described in U.S. Pat. No. 6,023,753 entitled "Manifold Array Processor", U.S. patent application Ser. No. 08/949,122 entitled "Methods and Apparatus for Manifold Array Processing", and U.S. patent application Ser. No. 09/169,256 entitled "Methods and Apparatus for ManArray PE-to-PE Switch Control". The interface to a host processor, other peripheral devices, and/or external memory can be implemented in many ways. The primary mechanism shown for completeness is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories including the VIM via the multiplexed bus interface represented by line 185. A high level view of the ManArray control bus (MCB) 191 is also shown.

All of the above noted patents and applications are assigned to the assignee of the present invention and incorporated herein by reference in their entirety.

Generalized Eventpoint Description

Figure 2A:
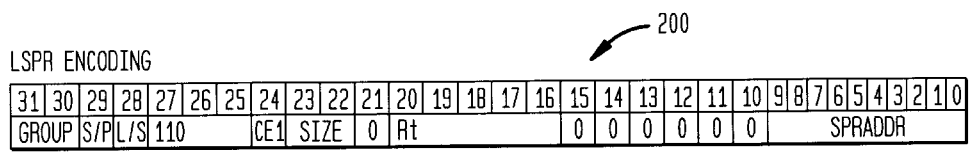
FIG. 2A illustrates an exemplary load from special purpose register (LSPR) instruction encoding.
Figure 2B:
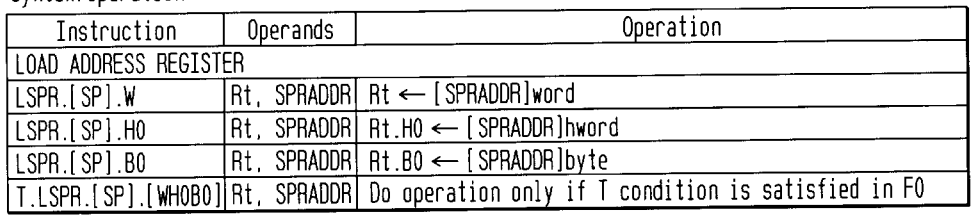
FIG. 2B illustrates an exemplary load from special purpose register syntax/operation description.

Each eventpoint specifies a set of one or more p-events which are to be monitored and the associated p-actions to perform when they occur. As part of the architecture definition, the eventpoints are separated into two basic classes: instruction eventpoints and data eventpoints. This separation allows a better utilization of the control register that specifies the eventpoints, though having a bit in the control register that selects instruction or data type eventpoints is not precluded. Both classes of eventpoint parameters and controls are stored in registers located in a ManArray special purpose register file (SPRF). SPRs are registers that provide specialized control and/or communication capabilities to the array processor. Most SPRs are accessible by the SP, but some are implemented in both the SP's SPR address space and in the PE's SPR address space. These registers are accessible in 1-cycle by the SP (or PE) when using the Load SPR (LSPR) instruction encoding format 200 shown in FIG. 2A, or store SPR (SSPR) instruction, having encoding format 300 of FIG. 3A. Syntax/operation tables 210 and 310 for these instructions are shown in FIGS. 2B and 3B, respectively. The LSPR instruction loads a byte, half-word, or word operand into an SP target register from an SP special-purpose register or into a PE target register from a PE special-purpose register. The SPR to load from is specified by its SPR Address SPRADDR. The SSPR instruction stores a byte, half-word, or word operand to an SP special-purpose register from an SP source register or to a PE special-purpose register from a PE source register. The SPR being stored to is specified by its SPR Address SPRADDR.

The SP and each PE contains an SPR file, each optimized according to its use. FIG. 4 shows an exemplary SPR register map 400 providing details of the placement of the instruction and data eventpoint registers in the ManArray SPR address space. The leftmost column 401 contains the specific system addresses for the eventpoint registers 410 as seen from the ManArray control bus (MCB). The next column 403 has the core SP/PE addresses for the eventpoint registers 410 as identified in the rightmost three columns 405, 407 and 409. The eventpoint SPRs have a guaranteed single cycle access. The primary mechanism to access to the SPRs is through the use of load and store SPR instructions that move data between the compute register file (CRF) and the SPRs. It is also possible to set the eventpoints via a system ManArray control bus (MCB). In that case, it takes multiple cycles to set up an eventpoint.

Even though no architecture limit is set for the total number of eventpoints that can be implemented, there is a practical limit dictated by the functionality desired. For example, one ManArray implementation specifies six instruction and three data eventpoints in the SP and a single data eventpoint in each PE. It is noted that each eventpoint has associated with it a small 8-bit control register and up to three parameter registers. The ManArray implementation is used as one suitable and presently preferred implementation in the description of the invention which follows.

Instruction Eventpoints

Figure 5:
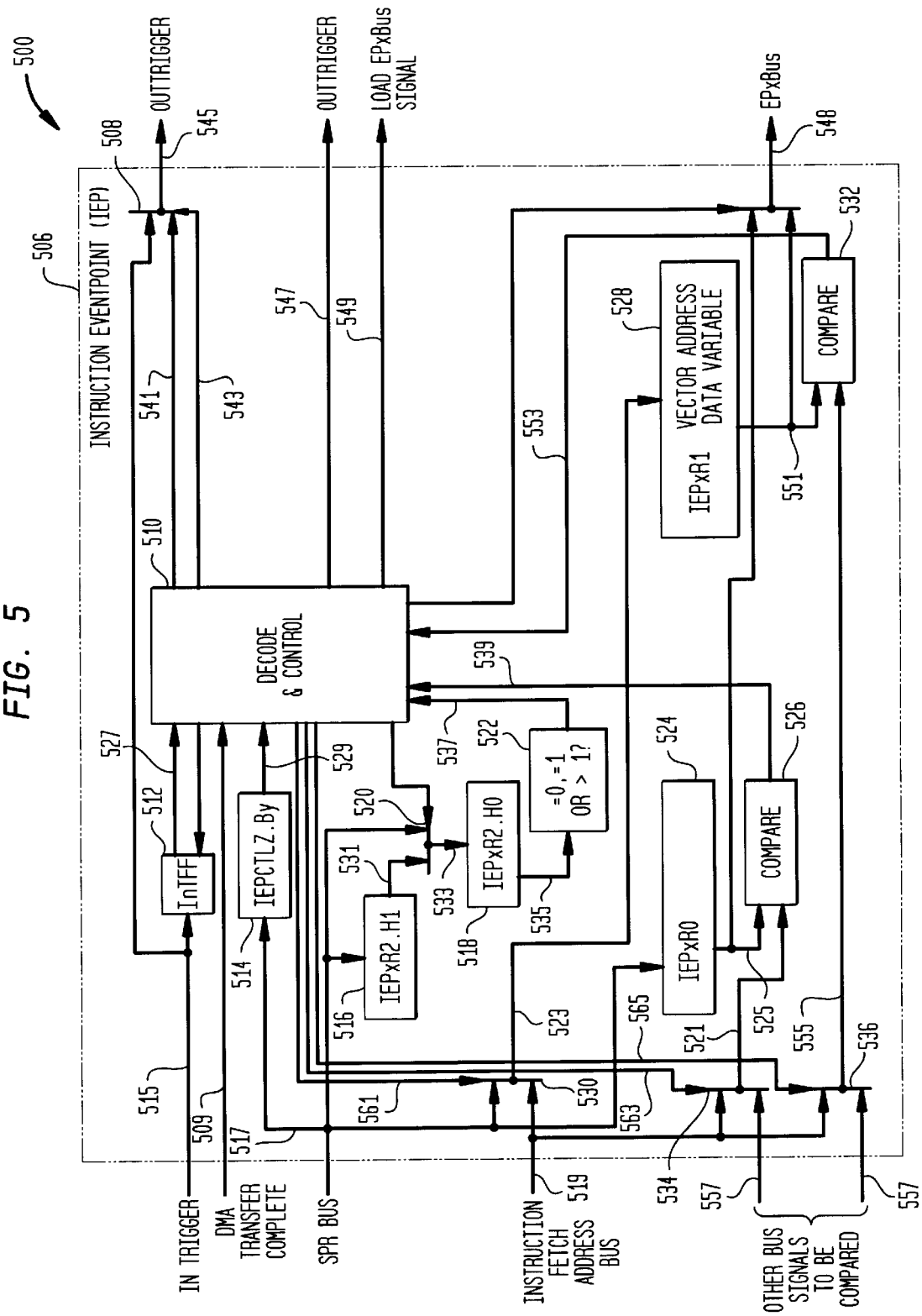
FIG. 5 illustrates an exemplary instruction eventpoint high level logic flow diagram.

An instruction eventpoint (IEP) implementation is described first. FIG. 5 depicts an exemplary instruction eventpoint module 500 having three eventpoint registers, comprising two half-word 16-bit registers 516 and 518, and two other eventpoint registers 524, and 528, an 8-bit control register 514 comprising a plurality of instruction eventpoint control bits, eventpoint decode and control logic 510 and the interfaces necessary for implementing the generalized instruction eventpoint architecture of the present invention. The IEPxR2.H0 register 518 is operable as a counter whose initial count value is loadable under program control. The plurality of instruction eventpoint control registers are byte-wide registers with one such assigned for each instruction eventpoint, for example, register 514. The eventpoint control registers for up to eight instruction eventpoints are stored in two 32-bit registers, IEPCTL0 and IEPCTLI, located in the SP SPR file and formatted as shown in the tables below:

IEPCTL0

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| S3 | P3 | T3 | | | IEP3 | | | S2 | P2 | T2 | | | IEP2 | | |

Register Reset Value = 0x00000000

| 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|
| S1 | P1 | T1 | | | IEP1 | | | S0 | P0 | T0 | | | IEP0 | | |

IEPCTL1

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| S7 | P7 | T7 | | | IEP7 | | | S6 | P6 | T6 | | | IEP6 | | |
| | | | | | | | | Reserved in Example System | | | | | | | |

Register Reset Value = 0x00000000

| 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|
| S5 | P5 | T5 | | | IEP5 | | | S4 | P4 | T4 | | | IEP4 | | |

Each eventpoint "x" has associated with it an IEPx control byte that specifies how the three eventpoint parameter registers IEPxR0, IEPxR1 and IEPxR2 are used for detecting instruction events and generating corresponding actions as explained further below. Each control byte is made up of a three bit field labeled (SPT) and a five bit field labeled with the instruction event point number (IEPx). The SPT encoding and meanings are given in the follow table:

| Code (SPT) | Meaning |
|---|---|
| 000 | No EP Interrupt, OutTrigger ← InTrigger, InTriggerFF always set |
| 001 | No EP Interrupt, OutTrigger ← InTrigger, InTriggerFF from InTrigger |
| 010 | No EP Interrupt, OutTrigger ← control logic, InTriggerFF always set |
| 011 | No EP Interrupt, OutTrigger ← control logic, InTriggerFF from InTrigger |
| 100 | EP Interrupt, OutTrigger ← InTrigger, InTriggerFF always set |
| 101 | EP Interrupt, OutTrigger ← InTrigger, InTriggerFF from InTrigger |
| 110 | EP Interrupt, OutTrigger ← control logic, InTriggerFF always set |
| 111 | EP Interrupt, OutTrigger ← control logic, InTriggerFF from InTrigger |

In general, the control logic for each eventpoint receives an input trigger signal from a predecessor eventpoint and generates a trigger signal output to a successor eventpoint. In the exemplary ManArray implementation, all SP resident eventpoints (IPE0–IEP5 and SP DEP0–DEP2) are linked in a circular chain so that it is possible to support chaining of the eventpoints. The SPT bits are defined as follows:

S Signal bit. Used to control output signal generation from eventpoint logic. This bit is primarily used to indicate whether or not an EP interrupt signal will be generated when the specified event occurs, but may be used for other purposes for some specialized types of event points.

P Pass-through control bit. This bit is most commonly used to indicate pass-through of the InTrigger signal from input to output. If this bit is a "0", then the InTrigger signal is passed from input to output of the eventpoint logic. If this bit is a "1" then the InTrigger signal is not passed to the output of the eventpoint logic.

T Trigger function bit. This bit is used to control the use of the InTrigger and/or InTriggerFF signals within the eventpoint logic. Its use is dependent on the control code (IEPx fields).

The term InTrigger refers to an input signal representing that a p-event has been detected. The term InTriggerFF refers to a latched signal to enable event monitoring. OutTrigger refers to an output control signal indicating a p-event has been detected, and EP Interrupt refers to whether an eventpoint interrupt is specified to occur on detecting the eventpoint. The detection of a p-event is indicated in the generation of an OutTrigger signal which is connected to the InTrigger input of the next eventpoint logic module to allow chaining of eventpoints. EP Interrupt is an output of an eventpoint module that can be enabled to cause an interrupt depending upon the encoding of the eventpoint control. In the exemplary ManArray architecture, the eventpoint interrupt is also termed the debug interrupt. The following table describes these signals in greater detail:

| | |
|---|---|
| InTriggerFF | The InTrigger flip-flop is a non-programmer-visible register bit used to enable event monitoring. The control of this bit depends on the value programmed into the event point control register 'T' bit, and on the event point operation code (IEPx). |
| InTrigger | This signal is used to designate the unlatched input trigger signal which is the OutTrigger signal from the previous event point module in the chain (see event point chaining description). |
| OutTrigger | This non-programmer visible signal is an output from an event point control logic or from the InTrigger signal. The source of this signal depends on the setting of the 'S' bit and the operation code in the event point's control field. |
| EXTOUT | This signal is asserted in Data Event Point control modes when the event point counter is being used as a semaphore and an address match has occurred with a non-zero count present. (In the example implementation this is used for DMA data flow control and these signals are connected to inputs in the DMA controller which cause semaphore increments). |
| EP Interrupt | This is a signal which allows the generation of an event point interrupt (also known as a debug interrupt) based on the occurrence of a detected event. The source of this signal depends on the setting of the 'S' bit and the operation code in the event point's control field. |

Operation utilizing these signals is illustrated in FIG. 5 and described in more detail in the following sections. In FIG. 5, the programmer/compiler specified content of the control register 514 is one of the byte fields from the 32-bit IEPCTL0 or IEPCTL1. The eventpoint control information is conveyed on the 8-bit output of the {SPT, IEPx} byte register on signal lines 529 to the decode and control logic 510.

Details for the three other eventpoint registers 524, 528, and the half-word 16-bit registers 516 and half-word counter register 518 for eventpoint "x" are shown in more detail in the tables below:

| IEPxR0 | | | | | | | | | | | | | | | |
|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 |
| IEPxR0.W (compare value) | | | | | | | | | | | | | | | |
| 15 | 14 | 13 | 12 | 11 | 10 | 09 | 08 | 07 | 06 | 05 | 04 | 03 | 02 | 01 | 00 |
| IEPxR0.W (compare value) | | | | | | | | | | | | | | | |

-continued

IEPxR1

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
| IEPxR1.W (compare value) ||||||||||||||||

| 15 | 14 | 13 | 12 | 11 | 10 | 09 | 08 | 07 | 06 | 05 | 04 | 03 | 02 | 01 | 00 |
|----|----|----|----|----|----|----|----|----|----|----|----|----|----|----|----|
| IEPxR0.W (compare value) ||||||||||||||||

IEPxR2

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
| IEPxR2.H1 Reload Count ||||||||||||||||

| 15 | 14 | 13 | 12 | 11 | 10 | 09 | 08 | 07 | 06 | 05 | 04 | 03 | 02 | 01 | 00 |
|----|----|----|----|----|----|----|----|----|----|----|----|----|----|----|----|
| IEPxR2.H0 Event Count ||||||||||||||||

IEPxR0 524 holds a programmer-specified value, that had been loaded via a store to special purpose register (SSPR) instruction, as illustrated in FIGS. 3A and 3B, over the SPR bus 517, which consists of address, data, and control, that is to be compared with a selected bus signal 521. Multiplexer 534 selects either the instruction fetch address bus 519 or other implementation specific bus signal 557 by means of multiplexer control signal 563. The multiplexer control signal 563 is generated based upon the decoding of the eventpoint control register IEPCTLz.By 514 contents, where z=0 or 1 and By represents the yth control byte of the 32 bit IEPCTLz control register. IEPxR0 524 contains either an address value (an instruction fetch address, a load unit's effective address, or a store unit's effective address) or an instruction as a data value. The exemplary implementation, though not architecturally limited to this, shown in FIG. 5 provides for two compare IEPxR0 paths: the instruction fetch address bus 519 and the other bus signal 557 which could be an instruction bus, for example.

For use in EP auto-loop constructs, the IEPxR0 register 524 is loaded, via the SSPR instruction, with the address of the last instruction in a program loop. During each instruction fetch, the contents of the IEPxR0 register 524 are compared with the instruction fetch address. When comparator 526 detects a match as indicated by signal 539, then, if the count value in the associated IEPxR2.H0 counter register 518 is greater than one, the program counter is loaded with the contents of the associated IEPxR1 register 528, which contains the address of the first instruction in the EP loop, to start a new iteration of the EP loop. The value stored in the IEPxR1 register 528 represents the programmer-specified value that had been loaded via the SSPR instruction either over the SPR bus 517, which consists of address, data, and controls, or the instruction fetch address bus 519 as selected by multiplexer 530 under control of the decode and control logic 510 and control output signal 561. The value loaded into the IEPxR1 register 528 is either passed to a background operation, over the EpxBus 551 or is used as an address to be loaded into the program counter (PC) as is done in eventpoint looping, using the EPxBus 551, to change the flow of the program to a new start address. The value placed upon the EPxBus 551 is accompanied by a load EPxBus signal 549. The IEPxR2 register is split into two half-word portions IEPxR2.H1 516 and IEPxR2.H0 518. The IEPxR2.H0 counter register 518 portion contains a programmer specified count value that is counted down on the detection of each event by counter hardware included in register 518. Certain eventpoints can cause the counter to be incremented. The counter register is useful for the counting of events and indicating if a count is pending or if, on a count down operation, it has reached a 1 or a 0. The count pending output, count=1 or count=0 situation is detected in detector block 522 connected to counter register output 235 and the appropriate signal 537 is sent to the decode and control logic 510. Both halfword portions of IEPxR2 are loaded over the SPR bus 517,which consists of address, data, and controls, and the IEPxR2.H0 portion can also be loaded with the IEPxR2.H1 value 531 as selected by multiplexer 520 to pass through to input 533, depending upon the event as controlled by the decode and control logic 510 based upon the control register 514. For example, in EP auto-loops when the end of the EP loop is reached, or, in other words, the IEPxR2.H0 is equal to 1 and the address in the associated IEPxR0 register matches the instruction fetch address, the contents of IEPxR2.H0 are replaced with the reload count IEPxR2.H1. Another option available to the eventpoint logic is to cause an EP interrupt 547 that changes the program flow to an EP interrupt routine useful for analysis and problem solving.

The operation of decode and control logic 510 is discussed below in connection with exemplary decode and control logic descriptions 600, 640, 650, 660, 670, 680, and 690 shown in FIGS. 6A–6G, where the control value, {Sx, Px, Tx, IEPx}, represents the byte control field loaded in control register 514 and is shown as SPTxxxxx. An operation column 601 of the tables describes the operation of the decode and control logic 510, use of the inputs, and specifies the output generation. A control value column 602 contains a functional description of the operation.

FIG. 6A will be explained in detail to describe the general operation of the eventpoint logic. On power on, line 603, the control value for eventpoint 'x' is '00000000' which indicates the eventpoint 'x' is disabled, no action is to be specified, and the InTrigger signal 515 of FIG. 5 is passed through the multiplexer 508 to the OutTrigger signal 545. When the IEPCTLz.By control byte is loaded with a value '00T11000' 604, the eventpoint is enabled to eventpoint looping, skip the loop if the count is zero, and if T=1 then InTrigger can be used to exit or skip the loop. In the operation description 601, pseudo code describes the control logic for this control code encoding. The symbols used are as follows: // precedes comments, ==is the equality operator, && is the logical AND operator, || is the logical OR operator, and A←B indicates the signal A or register A is assigned the value of the signal B or register B, respectively. Beginning at the top of FIG. 6A and noting references to FIG. 5, line 605 indicates the OutTrigger signal 545 is always assigned the InTrigger signal 515. The next two lines 606 and 607 indicate that if T=1, then the InTriggerFF 512 is set by the InTrigger signal 515. If this occurs, then the logic can exit or skip the loop dependent upon a previous event OutTrigger. This external event trigger is termed eventpoint chaining and is described in further detail below. Lines 608 and 609 cover the case where T=0. When T=0, then the InTriggerFF is set to a "1" which enables this eventpoint module and does not react to any external trigger event. Line 610 indicates that "When" the value in the program counter (PC), or, in other words, the instruction fetch address, equals the value stored in IEPxR0 OR the value of the PC equals the value stored in IEPxR1, then some type of action is to be taken. It is noted that for use in eventpoint looping the value stored in IEPxR0 is the last instruction in a program loop and the value stored in IEPxR1 is the first instruction of the program loop. Statement 610 indicates that when the program counter reaches either the start of a program loop or the last instruction in a program loop some p-action is to be taken. When this compare point is reached, the next line 611 indicates a compare 532 of the instruction fetch address 519 with the IEPxR1 551 which at the match point indicates the program counter has reached the first instruction of a loop. If this compare is true AND either the trigger is enabled AND active (line 612) OR the loop count is zero (line 613), then the p-action of lines 614–617 is to occur. Line 614 indicates the PC is loaded with the end of loop address, causing a jump to the end of the loop. The loop counter is reinitialized as indicated in line 615 and the InTriggerFF is cleared in line 616 to prepare it for another event detection. It is noted that since the PC was directed to the last instruction in the loop and the loop is to be bypassed this "last instruction in the loop" is canceled in line 617. It is further noted that this canceling procedure was done in this exemplary implementation to avoid a timing path problem with having an adder in the path to load "last instruction in the loop +1". Alternative implementations may choose to implement this adder scheme which is also supported by the present invention. When the program counter indicates a match with the loop end address, line 618, through a compare of the instruction fetch address 519 and IEPxR0 525, then the program sequence can either 1) fall out of the loop if a different trigger event has occurred, 2) fall out of the loop if the loop count indicates the loop has been completed or is zero for the single instruction loop case, or 3) branch back to the beginning of the loop if the loop is not complete. The next logic segment, lines 619–622, represents the logic and actions that are to occur if a different trigger event has occurred. In line 619, the requirement is: if T==1 AND InTriggerFF==1 which if true indicates the trigger is enabled and active. In FIG. 5, this logic is in the decode and control logic block 510 which receives input 527 from the InTriggerFF (InTFF) register 512. Given line 619 is true, then falling out of the loop, with a good probability that the number of loop iterations did not complete, is accomplished by line 620 which requires the hardware to load the program counter with the next sequential program step, i.e., taking the program away from the loop. In addition, line 621 requires the eventpoint to be reinitialized in case the loop is entered again by loading the loop reload count stored in IEPxR2.H1 into IEPxR2.H0. This reload path is implemented in FIG. 5 by lines 531 which connect the output of the reload count register IEPxR2.H1 to a multiplexer 520 which multiplexes this output with a signal on programming SPR path 517, which consists of address, data, and controls, as selected by the decode and control logic 510 to place the reload count value on the multiplexer output 533 for loading into the loop counter register 518 IEPxR2.H0. Further, the trigger event which caused the loop to exit is reset as indicated in line 622. The second case is covered by the "else" clause of line 623 which indicates a hardware compare of the loop counter output testing for a zero or one count. In FIG. 5, this is implemented in hardware in block 522 that tests the output of the IEPxR2.H0 counter register 518 and sends the results to the decode and control block 510. If this situation is detected, then the loop is to be exited due to count completion, or if the loop count had been loaded with a zero, then the program loop is not to be repeated. Consequently, line 624 requires the program counter to be loaded with the next sequential program address and line 625 requires the loop count to be reinitialized to the value stored in the reload count IEPxR2.H1. If these conditions are not met, line 626, then the loop count is neither a 0 nor a 1 and since the program counter is at the last instruction in the loop the loop is to be repeated. Consequently, the program counter is loaded with the loop "start" address IEPxR1 627. This loading is accomplished by sending the start address IEPxR1 value on the EPxBus 551 and a load EPxBus signal 549 to the program counter causing the PC to be loaded and directing the program flow back to the beginning of the loop. Line 628 indicates the loop counter register 518 is to be decremented indicating the loop has completed another execution sequence. This ends the logic operation description of what happens when the PC is at the end address of a loop.

Figure 6F:
Figure 6G:

FIGS. 6B–6G illustrate other forms of instruction eventpoint operations providing a programmer with unique capabilities due to the general approach taken for the architecture. For example, FIGS. 6C and 6D illustrate the logic operation for loop operations that can exit based on the state of the F0 arithmetic condition flag. FIG. 6E represents the logic operation for generating an EP or debug interrupt with optional pre-count and pre-trigger. The approach of FIG. 6F is useful for vectoring or branching to a target address after count matches have occurred. The approach of FIG. 6G is used to generate an EP interrupt after count InTriggers have been received. It will be appreciated that other eventpoint operations are easily achieved for numerous purposes using this architectural and programming approach for eventpoints.

Another aspect of this invention regards handling single instruction loops where the loop start address and loop end address are the same. To ensure correct operation, the instruction eventpoints have a priority associated with them to handle situations where more than one eventpoint asserts its control to load the PC with the next fetch address. The priority is chosen such that when a program uses nested loops that share starting and/or ending addresses, the inner most loop should be the lowest numbered eventpoint. The priority is as follows:

1) eventpoint 0 load of PC with IEP0R1 *
2) eventpoint 1 load of PC with IEP1R1 *
3) eventpoint 2 load of PC with IEP2R1 *
4) eventpoint 3 load of PC with IEP3R1 *
5) eventpoint 4 load of PC with IEP4R1 *
6) eventpoint 5 load of PC with IEP5R1 *
7) eventpoint 5 load of PC with IEP5R0
8) eventpoint 4 load of PC with IEP4R0

9) eventpoint 3 load of PC with IEP3R0

10) eventpoint 2 load of PC with IEP2R0

11) eventpoint 1 load of PC with IEP1R0

12) eventpoint 0 load of PC with IEP0R0

For the asterixed items above, this priority is used in the logic provided that one of the two following statements is true:

a) the eventpoint is configured as a loop and no higher numbered eventpoint asserts control to skip a loop, or b) for those alternative uses of the eventpoint logic, the eventpoint is not configured as a loop.

Eventpoint Looping

Figures 7C, 7D:
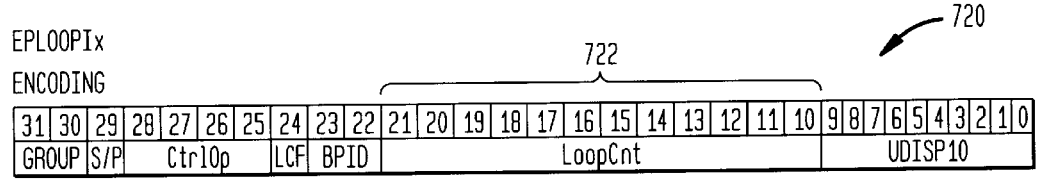
FIG. 7C illustrates an exemplary event point loop immediate (EPLOOPI) instruction encoding in accordance with the present invention.
FIG. 7D shows a syntax/operation table for the EPLOOPI instruction of FIG. 7C.

To minimize the number of set-up cycles, specialized instructions, a set up and execute an instruction eventpoint loop (EPLOOPX) instruction encoding 700 shown in FIG. 7A and a set up and execute an instruction eventpoint loop immediate (EPLOOPIx) instruction encoding 720 shown in FIG. 7C may be advantageously employed. The syntaxioperation descriptions 710 and 730 for these instructions are shown in FIGS. 7B and 7D, respectively. The EPLOOPx instruction 700 sets up and executes a program loop beginning with the next sequential instruction. The instruction eventpoint register (IEPxR1) is loaded with the address of the next sequential instruction, representing the start address of the first instruction in the loop. The instruction event point register (IEPxR0) is loaded with the address of the last instruction in the loop, which is the sum of the address of the LOOP instruction and a 10-bit unsigned displacement UDISP10 which is produced in the assembly using a label. The appropriate instruction eventpoint control field IEPx, IEP0–IEP3, in the IEPCTL0 register is loaded with the hexadecimal value 0x18. If the loop counter (IEPxR2.h0) is non-zero, execution proceeds with the next sequential instruction. If the loop counter is zero, the body of the loop is skipped and execution proceeds with the next sequential instruction after the address in IEPxR0. While a loop is active (Loop Counter>0) each instruction address is compared to the IEPxR0. When there is a match and Loop Counter>1, PC is set to IEPxR1 and the Loop Counter is decremented. When there is a match and Loop Counter=1, the Loop Counter is loaded with the Loop Reload Value and the loop is exited. It is noted that the "x" in EPLOOPx, IEPxR0, IEPxR1 and IEPxR0 is equal to the BPID value 0, 1, 2 or 3.

The EPLOOPIx instruction 720 shown in FIG. 7C sets up and executes a program loop beginning with the next sequential instruction. The instruction eventpoint register (IEPxR1) is loaded with the address of the next sequential instruction. The instruction eventpoint register (IEPxR0) is loaded with the address of the last instruction in the loop, which is the sum of the address of the EPLOOPI instruction and the 10-bit unsigned displacement UDISP10. The instruction eventpoint register (IEPxR2) is loaded with the unsigned 12-bit value LoopCnt, placing the value in both the upper and lower half-words. The appropriate instruction eventpoint control field IEPx, IEP0–IEP3, in the IEPCTL0 register is loaded with the hexadecimal value 0x 18. If the loop counter (IEPxR2) is non-zero, execution proceeds with the next sequential instruction. If the loop counter is zero, the body of the loop is skipped and execution proceeds with the next sequential instruction after the IEPxR0. While the loop counter is greater than zero, a loop is active and each instruction address is compared to the IEPxR0. When there is a match and the loop counter is greater than one, PC is set to IEPxR1 and the loop counter is decremented. When there is a match and the loop counter equals one, the loop counter is loaded with the loop reload value and the loop is exited.

The EPLOOP and EPLOOPI instructions 700 and 720 are used to provide a low latency mechanism for a select group of the eventpoints. The exemplary ManArray architecture allows up to four nested eventpoint loops so as to better optimize utilization of the eventpoint hardware and conserve bits in the EPLOOP instructions. Specifically, the four eventpoints are specified in the EPLOOP and EPLOOPI instructions, by means of the BPID encoding in bits 23–22, for this purpose.

An exemplary pipeline timing diagram 800 for a ManArray processor implementation for the start up sequence of the EPLOOPx instruction 700 for a multi-instruction program loop is shown in FIG. 8. It is noted that for the EPLOOPx instruction the loop count is loaded using the SSPR instruction prior to issuing the EPLOOPx instruction. EPLOOPIx simplifies this further by not requiring a separate load of the loop count value as it is already contained in an immediate field 722, bits 21–10 in the instruction 720 of FIG. 7C.

The pipeline timing diagram 800 of FIG. 8 is made up of five columns: a clock cycle indicator column 802 which is set to zero as a reference point for the fetch of the EPLOOPx instruction, an EP compare column 804 indicating when the compares for a program loop occur, a fetch column 806 indicating the instruction fetch sequencing, a decode column 808 indicating the operations that occur during decode, and an execute column 810 indicating the operations that occur during execute. Beginning with cycle 0 shown in row 812, the EPLOOPx instruction is fetched and prior instructions continue to execute. In cycle 1 shown in row 814, the first instruction of the program loop is fetched. In the decode phase, the end address for the loop is calculated as program counter value plus a 10-bit displacement obtained from the EPLOOPx instruction. The program counter is held, and a no-operation (NOP) instruction is inserted in the pipe. Also, in the execute phase, the previous instruction to the EPLOOPx instruction is executed. In cycle 2 shown in row 816, no new instruction is fetched as the first instruction of the program loop has already been fetched. In the decode phase, the hardware executes the NOP that was inserted in the pipe in the previous cycle. In the execute phase, the end address is sent to the IEPx module on the SPR bus and loaded into IEPxR0. The program counter value is loaded into IEPxR1 representing the start address of the loop. The program counter is still held, and a second NOP instruction is inserted in the pipe. In cycle 3 shown in row 818, the first compare of IPExR0 loop start address with the program counter is done with a match signal generated. The first instruction of the loop is allowed to continue in the pipe. In the decode phase, the second inserted NOP is decoded. In the execute phase, the first inserted NOP is executed. In cycle 4 shown in row 820, the next or second instruction of the program loop is fetched. In the decode phase, the first instruction of the loop is decoded. In the execute phase, the second inserted NOP is executed. In cycle 5 shown in row 822, the processing continues to proceed with fetching, decoding, and executing the instructions in the program loop.

Data Eventpoints

Figure 9:
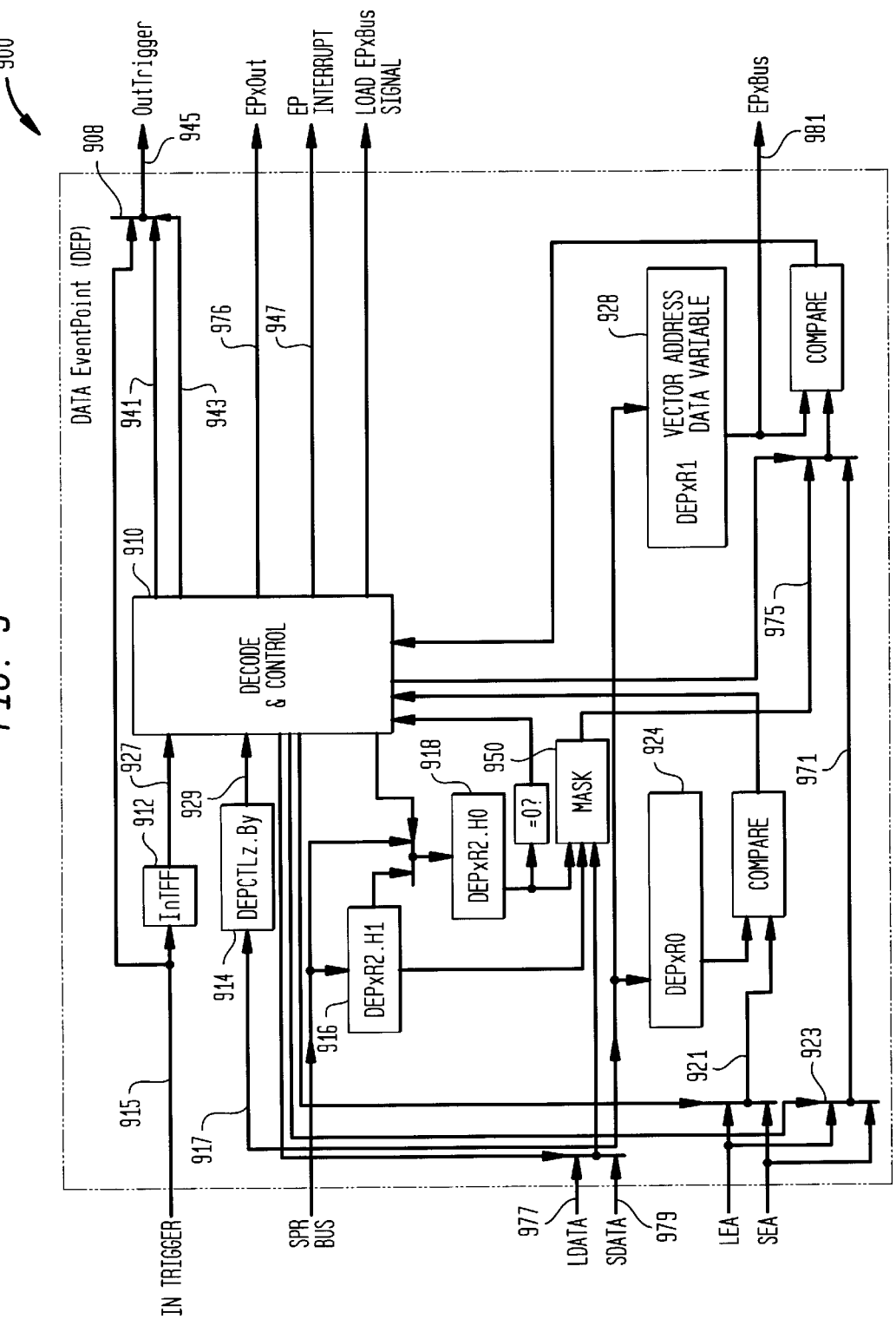
FIG. 9 illustrates an exemplary data eventpoint high level logic flow diagram.

FIG. 9 shows an exemplary data eventpoint module 900 having three data eventpoint registers, comprising two half-word 16-bit registers 916 and 918, and two other parameter registers 924 and 928. Data eventpoint module 900 also includes a control register 914, eventpoint decode and control logic 910 and the necessary interfaces required for a generalized data eventpoint architecture in accordance with the present invention. The data eventpoint control register 914 is one of a plurality of byte-wide control registers, with one byte-wide register assigned for each data eventpoint. The data eventpoint control registers for up to three data eventpoints may be suitably stored in an SPR file made up of a 32-bit register as shown in the tables below:

SP/PE0 DEPCTL0

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| Reserved | PEDEP2 | PEDEP1 | PEDEP0 | Reserved | DMASe12 | DAMSe11 | DMASe10 | S2 | P2 | T2 | DEP2 | | | | |

| 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|
| S1 | P1 | T1 | DEP1 | | | | | S0 | P0 | T0 | DEP0 | | | | |

PEx DEPCTL0

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| Reserved | | | PEDEP0 | | Reserved | | | DMASe10 | | | Reserved | | | | |

| 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|
| Reserved | | | | | | | | S0 | P0 | T0 | DEP0 | | | | |

In the above tables,
DEPx    Specifies how DEPxR0, DEPxR1 and DEPxR2 are used for detecting data events and generating corresponding actions.
Sx      Sx = 0: Do not output debug interrupt on match event.
        Sx = 1: Debug interrupt is driven by control logic on match event.
Px      Px = 0: Pass In Trigger signal to OutTrigger signal (except when generating an
        OutTrigger from control logic).
        Px = 1: Always generate OutTrigger from control logic.
Tx      Tx = 0: InTriggerFF always set to '1' during monitoring.
        Tx = 1: InTriggerFF set by InTrigger signal (previous EP's OutTrigger signal).
DMASelx Select DMA Lane address for DEPx. For DMA synchronization DEP control codes.
        DMASelx = 0: Monitor DMA Lane 0 address.
        DMASelx = 1: Monitor DMA Lane 1 address.
PEDEPx  For SP/PE0, these bits indicate whether the DEP is configured to monitor SP or PE0 addresses.
        PEDEPx = 0: Monitor SP data addresses.
        PEDEPx = 1: Monitor PE0 data addresses.

It is noted that in the exemplary implementation specified by the control register definition above, additional data eventpoints can be added by using another data eventpoint control register for each group of up to three data eventpoints. The control register 914 represents one of the byte fields from the DEPCTL0 and passes the 8-bits of control information on signal lines 929 to the decode and control logic 910.

Further details for the three other data eventpoint registers 924 (DEPxR0), 928 (DEPXR1), and 16-bit half-word registers 916 and 918, DEPxR2.H1 and DEPxR2.H0 respectively, are shown in the tables below:

DEPxR0

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| parameter value | | | | | | | | | | | | | | | |

| 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|
| parameter value | | | | | | | | | | | | | | | |

DEPxR1

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| parameter value | | | | | | | | | | | | | | | |

| 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|
| parameter value | | | | | | | | | | | | | | | |

-continued

DEPxR2

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
| | | | | | | | | DEPxR2.H1 | | | | | | | |
| 15 | 14 | 13 | 12 | 11 | 10 | 09 | 08 | 07 | 06 | 05 | 04 | 03 | 02 | 01 | 00 |
| | | | | | | | | DEPxR2.H0 | | | | | | | |

The register DEPxR0 924 holds a programmer-specified value, loaded over the SPR bus 917, which consists of address, data, and controls, that is to be compared with the bus/signals 921 as selected by the control register 914 DEPCTLz.By encoded bit field. In the data eventpoint module 900 of FIG. 9, multiplexer 923 provides a mechanism to select either the load effective address (LEA) or the store effective address (SEA) as the value on the multiplexer output 921 to be compared. This mechanism provides the capability to trigger an event on a match of a load data effective address or a store data effective address. The register DEPxR1 928 holds a programmer specified data value, loaded over the SPR bus 917, which consists of address, data, and controls, that is to be compared with either a selected data value 975 that represents a masked 950 LDATA or SDATA bus by use of the DEPxR2.H1 and DEPxR2H0 or one of the bus/signals 971 as selected by the control register 914 DEPx encoded bit field. It is noted that the load data (LDATA) bus 977 and store data (SDATA) bus 979 are latched data values stored in a hidden scratch pad register due to the execution pipeline in use for the ManArray processor. The DEPxR2.H0 count register 918 can also act as an eventpoint counter which indicates a count of 1, a count of 0, or if the count is greater than 1. The decode and control logic 910 operation is described in detail in operation tables 1010, 1015, 1020, 1030, 1040, 1050, 1060, 1070, 1080, 1090, and 1095 shown in FIGS. 10A–10J. These tables are constructed in the same manner as the instruction eventpoint logic descriptions of FIGS. 6A–6G. The control value column 1012 of each figure provides a description of the logic operation for the programmed control value also indicated in the same column. Matches with the load effective address (LEA), the store effective address (SEA), load data (LDATA), and/or store data (SDATA) of the data memory accesses are enumerated as options for the data eventpoint logic. Background DMA operations, described in greater detail below, are also presented with use of data eventpoints in FIGS. 10I and 10J. It is appreciated that other eventpoint operations are easily achieved for numerous purposes using this architectural and programming approach for eventpoints.

When a data eventpoint is detected, one option selected by the eventpoint logic is to cause an EP interrupt 947 that changes the program flow to a debug interrupt routine useful for analysis and problem solving. The EPxOut signal 976 of FIG. 9 is asserted in data eventpoint control modes when the eventpoint counter is being used as a semaphore and an address match has occurred with a non-zero count present. For example, this approach is used for DMA data flow control by connecting the signal to inputs in the DMA controller which cause semaphore increments. Each data event point provides an EPxOut signal to a controlling event action module such as a DMA controller. The use of eventpoints in DMA operations is discussed further after eventpoint chaining and eventpoint status are discussed.

Eventpoint Chaining

FIG. 11 depicts an eventpoint chaining apparatus 1100 which may be advantageously used in an exemplary implementation of the ManArray architecture similar to the system shown in FIG. 1 is discussed further below. The eventpoint chaining apparatus 1100 uses the OutTrigger (OutTrig) signal, for example signal 1101 from an eventpoint module 1104 as an input InTrigger (InTrig) signal 1103 for the next eventpoint module 1102. Eventpoint modules 1102–1118 are linked together in a circular chain. The chaining of eventpoints, in reference to FIGS. 5 and 9, is accomplished through the use of the OutTrigger signal 545 or 945 and the InTrigger signal 515 or 915. The OutTrigger signal 545 or 945 is selected by multiplexer 508 or 908 as controlled by control signal 543 or 943, when the OutTrigger path 941 is enabled and an eventpoint is discovered. Alternatively, the InTrigger signal 515 or 915 can be passed through the eventpoint module as selected by multiplexer 508 or 908 and controlled by control signal 543 or 943. The InTriggerFF (InTFF) latch 512 or 912, when enabled, captures the state of the InTrigger signal 515 or 915 which is sent to the decode and control logic 510 or 910 over line 527 or 927. The InTFF latch, 512 or 912, is cleared whenever A value is written to the control register field associated with its eventpoint, or An eventpoint match has occurred, or The eventpoint is disabled.

The OutTrigger output 545 or 945 from an eventpoint module connects to the InTrigger input 515 or 915 of the assigned eventpoint module.

FIG. 11 depicts an exemplary chaining with a mixture of six instruction eventpoints SP/PE0 IEP5-0 and three data eventpoints DEP2-0 in the SP/PE0, such as the SP/PE0 101. It is noted that the specific order of the chaining shown represents one choice as used in an exemplary implementation of a 2×2 ManArray processor. It is further noted that while the chaining of data eventpoints between PE is not shown and the use of multiple data eventpoints in each PE is not shown in FIG. 11, these options are not precluded by the architecture of the present invention. The OutTrigger (OutTrig) from each eventpoint module is connected to the InTrigger (InTrig) of the connecting eventpoint module.

Eventpoint Status

Eventpoints may be programmed with various control options. The purpose of some of these options is simply to detect when a particular event or sequence of events has occurred. The EPSTAT register is used to capture event occurrence for those events which generate an EP interrupt so that if multiple eventpoint interrupts are being tracked, they may be distinguished. Suitable EPSTAT registers and the chosen definition for the status bits for the exemplary 2×2 ManArray implementation are shown in the following format tables for a 32-bit example. Since the ManArray processor merges the SP array controller with PE0 of the PE array, the EPSTAT register data eventpoints are shared between the SP and the PE0. In other implementations, this organization may not exist, but the concepts and use of the eventpoints and the EPSTAT registers still applies.

SP/PE0 EPSTAT (Read-only, SP SPR)

| 311 | 300 | 299 | 288 | 277 | 266 | 255 | 244 | 233 | 222 | 211 | 200 | 199 | 188 | 177 | 166 |
|---|---|---|---|---|---|---|---|---|---|---|---|---|---|---|---|
| | | | | | | | Reserved | | | | | | | | |

Reset Value = 0x00000000

| 155 | 144 | 133 | 122 | 111 | 100 | 099 | 088 | 077 | 066 | 055 | 044 | 033 | 022 | 011 | 000 |
|---|---|---|---|---|---|---|---|---|---|---|---|---|---|---|---|
| | IEV5 | IEV4 | IEV3 | IEV3 | IEV1 | IEV0 | | | Reserved | | | | DEV2 | DEV1 | DEV0 |

PE EPSTAT (Read-only, PE SPR)

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| | | | | | | | Reserved | | | | | | | | |

| 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|
| | | | | | | Reserved | | | | | | | | | DEV0 |

DEVx  This bit is set when a match event generates an EP interrupt for Data Event Point 'x'. (Not all control codes that may be programmed cause an interrupt to be generated on a match event, and for these cases the DEVx bits are not set).
0 = event has not occurred
1 = event has occurred IEVx  This bit is set when a match event generates an EP interrupt for Instruction Event Point 'x'. (Not all control codes that may be programmed cause an interrupt to be generated on a match event, and for these cases the IEVx bits are not set).
0 = event has not occurred
1 = event has occurred FIG. 11 further illustrates that for each eventpoint module 1102–1123 an EP Interrupt can be generated. All instruction 1126 and data 1128 eventpoint EP interrupts are logically ORed together by OR gate 1125 to provide the eventpoint interrupt signal to the SP interrupt control unit 1130. Within the SP and PEs, the EPSTAT registers are used to store event status from SP or PE resident event point control logic. The EP status saved in the EPSTAT registers indicates when an event point has matched its event criteria and generated an EP interrupt. A read from this register returns the status while a write to this register with any data clears the status flags. These bits are also cleared at reset. It is noted that other formats and bit definitions are not precluded. For example, status indication on any match event can be provided in addition to the above noted match and EP interrupt event status.

The SP/PE0 and each of the other PEs contains an EPSTAT register that is visible in their own SP and PE SPR address spaces. In the SP/PE0, the SP EPSTAT register can be read by use of the LSPR.S instruction illustrated in FIGS. 2A and 2B. In the PEs, the PE EPSTAT register can be read by use of the LSPR.P instruction also illustrated in FIGS. 2A and 2B. In the exemplary implementation of FIG. 1, each PE's EPSTAT register contains only a single status bit that indicates if the PE generated a match event which caused an EP interrupt. In this illustrative example, each PE, such as one of the PEs 151, 153 or 155 of FIG. 1, supports one data eventpoint requiring only three parameter registers and one control register. Specifically, PE event status may be read using an LSPR.P instruction along with SPRECV instructions to retrieve each PE's status to the SP register file. The SPRECV instruction causes the specified SP target register to receive data from PE0's cluster switch input port. Even though the exemplary implementation describes only a single eventpoint per PE, multiple data eventpoints per PE are not precluded and may be readily implemented utilizing the present teachings.

In the SP and depending upon the implementation and with two eventpoint control register specifications, up to eight instruction eventpoints can be setup. It will be recognized that additional eventpoints can be added as desired. The eventpoints can be shared and combinations of capabilities provided. For example, 1 in the SP, two nested EP loops with two background DMA operations with two instruction and two data debug eventpoints can be programmed. In addition, highly advantageous capabilities, as described in the control value and logic description of FIGS. 6A–6F and 10A–10G, are provided to the general programmer.

Eventpoint Background DMA

Figure 12A:
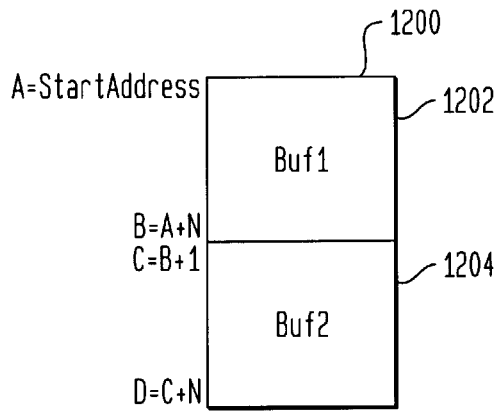
FIGS. 12A, 12B, and 12C illustrate aspects of an exemplary background DMA eventpoint program in accordance with the present invention.

One of the many unique uses of the present eventpoint architecture is its use to initiate and control background direct memory access (DMA) operations to efficiently move data while normal processing continues. For example, the managing of a data buffer 1200, such as is shown in FIG. 12A, where a local memory data segment M is split into two buffer portions, a Buf1 1202 and a Buf2 1204. In a typical application, such as processing an MPEG compressed bitstream, it is desirable to achieve efficient processing of the data without using a lot of performance-limiting memory management steps. The eventpoint architecture of the present invention advantageously achieves this goal as discussed further below. In one approach using data-access triggered DMA, the following requirements are assumed:

A stream of variable-length data elements is consumed from a circular buffer in memory which is of length BUFSIZE words.

The elements are processed as they are read. A new word is loaded into the buffer at intermittent intervals based on the size of the variable length code (vlc).

Conditional execution is used to perform the LOAD of a new word, and a load does not occur on every pass through the "get new vlc" function. Thus, there is not a direct correlation between fetching of an instruction address and consumption of data.

It is desired to trigger a background refill operation after N data accesses from the buffer, not N instruction fetches from a particular address. In this case, the background operation is a DMA operation to refill a buffer.

It is necessary to prevent overrun of the buffer, in other words, to prevent DMA writes on top of unprocessed data.

It is necessary to prevent underrun, in other words, to prevent the case where the processor reads ahead of data.

It is assumed a ping-pong buffer is accessed in a circular fashion by the SP code.

Buffer halves are labeled Buf1 and Buf2, each of length N.

A DMA transfer is set up to move N words of data at a time to a circular buffer of size 2N, that is the core transfer count (CTC) of data to be transferred to the core is N, but the buffer size of the circular transfer is 2N.

The DMA transfer uses a semaphore to indicate when it is allowed to fill a buffer. Initially, the DMA semaphore is set to 2, indicating it can fill both buffers. Each time the DMA unit decrements CTC to zero, i.e., transfers N data values, it also will decrement and check the semaphore. If the semaphore is non-zero after the decrement, the transfer reloads CTC with N and continues the transfer, filling the other half of the buffer (Buf2). If the semaphore has been decremented to zero, then the DMA waits until it is non-zero to reload CTC and continue with another transfer.

Whenever N data elements are transferred (CTC reaches zero), the DMA sends a signal to an eventpoint (EP) module which causes it to increment its count value.

Whenever the SP accesses a data address (via a LOAD instruction in this case) that has been programmed into the EP block, the EP sends a signal to the DMA unit which causes its semaphore to increment.

If the EP count value is zero, then the SP will optionally stall to wait for data to arrive.

If the EP count is non-zero, the EP count is decremented and the SP continues.

If both the DMA and SP access the counter simultaneously and the count remains the same, the SP is allowed to continue.

Since a Data EP can only specify up to 2 address parameters in the example implementation, the count value can be up to two.

Signaling from DMA to EP block is done by each DMA Lane Controller which routes its CTCzero interrupt signal to 1 of the IEP and 1 of the DEP modules of the SP.

Figure 12B:
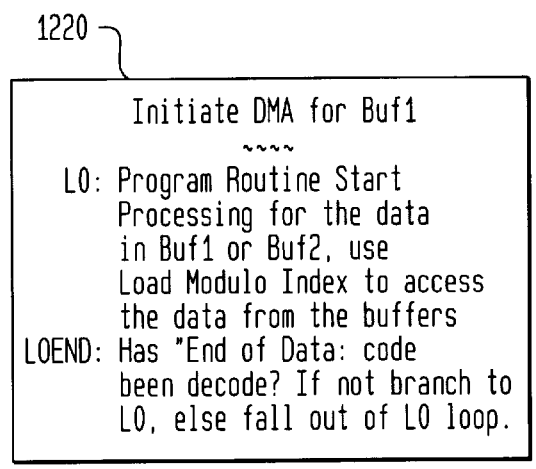
Figure 12C:
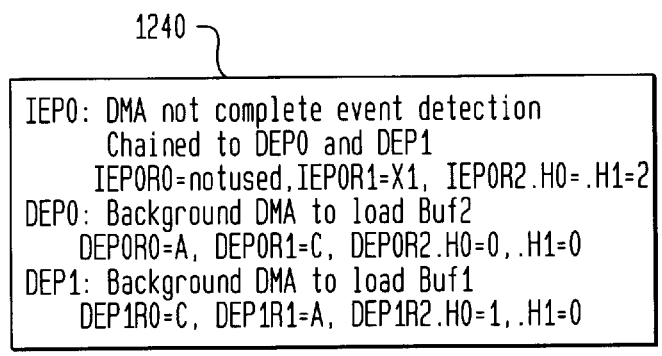

In another approach, FIG. 12B contains an outline of a simple program routine 1220 set up as a data dependent loop to process an unknown quantity of data elements. The data processing is to continue until an end-of-data code is decoded from the received encoded bit-stream stored in the buffers prior to processing. Initially, a DMA for Buf1 is started, after which the program routine starts at address L0. The routine 1220 then loops until an end-of-data code is decoded. The routine accesses data from the memory buffer by use of a load modulo index type of instruction that begins addressing at the address A, the start address of FIG. 12A, and automatically wraps the address around, at the end of Buf2, to the beginning of Buf1, address A. The three eventpoints used are shown in table 1240 of FIG. 12C. The first eventpoint is an instruction event point that is chained to the two data eventpoints, DEP0 and DEP 1. The IEP0 eventpoint, control value 0PT00001 670 of FIG. 6F, is setup with IEP0R0=not used, IEP0R1=X1, address of DMA-not-complete-do-something-else program, and IEP0R2.H0= IEP0R2.H1=2, indicating at the start that either Buf1 or Buf2 has data. The IEP0 counter is set up by its decode and control logic to increment the counter upon receiving a DMA transfer complete signal 509 (FIG. 5). The counter decrements whenever an InTrigger event occurs. The instruction eventpoint, when InTrigger occurs and the count is a one, causes the vector address X1 to be loaded into the PC thereby changing the program flow to the DMA-not-complete-do-something-else routine. In normal operation, the count is incremented by the DMA transfer complete signal prior to receiving an InTrigger signal and the IEP0 eventpoint will not occur. If the DMA is held up and the DMA operation is not complete, only then will the program reach the special routine. The other two background DMA data eventpoints are set up for interfacing with the system DMA unit. The first one uses data eventpoint0 (DEP0) with DEP0R0=A, the Start address of Buf1, DEP0R1=C, the start of Buf2 address, and DEP0R2.H0=0, DEP0R2.H1=0, Buf2 empty state. The second one uses data eventpoint1 (DEP1) with DEP 1R0=C, the start of Buf2 address, DEP1R1=A, the start of Buf1 address, and DEP1R2.H0=1, DEP1R2.H1=0, Buf1 full state. It is further assumed for this example, that the size of Buf1 is equal the size of Buf2 (FIG. 12A), and the DMA unit is set up previous to the program routine to transfer a buffer size of N beginning at a start address that is passed to the DMA hardware when the background DMA is initiated.

The sequence of events is as follows assuming Buf1 is fully loaded with the initial data at the start of the program. The program routine begins processing data in Buf1, which on the first access at address A the DEP0 eventpoint is detected which initiates a DMA operation to load data into Buf2 beginning at address C, which address value is passed to the DMA hardware unit over the EPIBus 981. When DEP0 is activated, the count in IEP1R2.H0 reloads a 0 indicating that Buf2 is empty. The program routine continues processing the data in Buf1 while the DMA unit in the background independently loads the next set of data elements into Buf2. At the end of the DMA transfer of data to Buf2, the DMA unit generates a DMA complete signal which increments the Buf2 count in DEP0R2.H0 to 1 indicating Buf2 is now full and processing can proceed. Meanwhile, the processing of Buf1 data has continued until it reaches the first data element in Buf2 at address C and DEP1 eventpoint is triggered reloading DEP1's count DEP1R2.H0 to zero indicating Buf1 is now empty and DEP1R1=A is passed to the DMA unit over the EP0Bus 981. The DMA unit now initiates the background loading of Buf1 while the program is allowed to continue with the processing of Buf2 data. The program routine continues processing the two buffers until the end-of-data code is decoded. If the program ever tries to access data from Buf1 at address A, or Buf2 at address C, and the DMA transfer has not completed for that buffer, instruction eventpoint IEP0 is triggered, indicating the background DMA has not completed operation.

This concept is extended by allowing address masking in the address compare, for example, by using a single address with a mask register, and then supporting multiple address matching for buffer sizes that are a power of 2. Since masking is already allowed for the data compares, this approach may be readily implemented. Address masking is also useful for trapping when access to specified regions of memory by either instruction fetch or data fetch is attempted.

The generalized eventpoint architecture shown in FIGS. 5 and 9 and discussed above in detail includes the advantageous capabilities highlighted in the partial list that follows: auto looping, auto looping with loop skip if count is zero, auto looping where an InTrigger signal can be used to exit or skip the loop, background DMA, initiating a timer from some data or instruction eventpoint, and cache pre-fetch operation.

While the present invention has been disclosed in the context of various aspects of presently preferred embodiments, it will be recognized that the invention may be suitably applied to other environments and applications consistent with the claims which follow.

We claim:

1. A method for specifying different type generalized event detection and action pairs in a processing environment comprising the steps of:
   loading a control register to specify a generalized processor event (p-event) and to define a generalized processor action (p-action) to be taken in response to p-event detection;
   loading at least one of a plurality of p-event parameter registers depending on the specified p-event;
   detecting the p-event indicating a change of processor state by utilizing the control register and the plurality of p-event parameter registers; and
   implementing the p-action in response to the detection of the generalized p-event.

2. The method of claim 1 wherein said step of detecting a generalized p-event is performed utilizing a compare operation to perform a control register specified test if an instruction address, a data memory address, an instruction, a data value, an arithmetic-condition flag or another processor change of state eventpoint has occurred.

3. The method of claim 1 wherein said step of implementing a generalized p-action is performed by causing a control register specified change in the processor state including changing the program flow by loading a program counter with a new instruction address, generating an interrupt, generating a log, counting the p-event or taking another action appropriately responsive to the particular p-event detected.

4. The method of claim 1 further comprising the steps of:
   executing an auto-loop; and
   branching out of the auto-loop as the p-action upon detecting a specified condition as the detected generalized p-event.

5. The method of claim 1 further comprising the steps of:
   executing a nested auto-loop; and
   branching out of the nested auto-loop as the p-action upon detecting a specified condition as the detected generalized p-event.

6. The method of claim 1 wherein the p-action comprises changing a sequential flow of instructions.

7. The method of claim 1 wherein the p-action initiates a branch to a debug diagnostic program.

8. The method of claim 1 wherein the p-action initiates a background operation such as a direct memory access (DMA).

9. The method of claim 1 wherein the p-action results in a cache prefetch operation.

10. The method of claim 1 further comprising the step of:
    linking a chain of p-events together for eventpoint purposes.

11. The method of claim 1 further comprising the step of defining eventpoints specifying sets of one or more p-events which are to be monitored and associated p-actions to perform when they occur in the order programmed for detecting a chain of p-events.

12. The method of claim 11 further comprising the step of dividing eventpoints into two basic classes, instruction eventpoints and data eventpoints.

13. The method of claim 12 wherein data eventpoints and instruction eventpoints may be mixed in a chain of eventpoints for the purposes of determining a specific programmed p-action.

14. An eventpoint module for specifying different type generalized event detection and action pairs in a processing environment, the eventpoint module comprising:
    means for loading a control register to specify a generalized processor event (p-event) and to define a generalized processor action (p-action) to be taken in response to p-event detection;
    means for loading at least one of a plurality of p-event parameter registers depending on the specified p-event;
    means for detecting the p-event indicating a change of processor state, said means for detecting utilizing the control register and the plurality of p-event parameter defining registers; and
    means for implementing the p-action in acknowledgement in response to the detection of the generalized p-event.

15. The apparatus of claim 14 wherein the plurality of p-event parameter defining registers further comprises three p-event parameter defining registers storing three eventpoint parameters.

16. The apparatus of claim 15 wherein the three p-event parameter defining registers storing three eventpoint parameters comprise a first compare register to compare against, a second register containing a second compare register, and a count or mask register.

17. The apparatus of claim 16 wherein an EPLOOPx instruction is used with improved efficiency of the loading of the control and the three p-event parameter defining registers.

18. The apparatus of claim 17 wherein the control register is loaded with an auto-loop control parameter.

19. The apparatus of claim 17 wherein one p-event parameter defining register is loaded with a loop start address, and another p-event parameter defining register is loaded with a loop end address generated by the addition of an EPLOOPx immediate field with the loop start address.

20. The apparatus of claim 17 wherein an auto-loop count parameter is loaded in one p-event parameter defining register by a separate load instruction.

21. The apparatus of claim 16 wherein an EPLOOPIx instruction is used with improved efficiency of the loading of the control and the three p-event parameter defining registers.

22. The apparatus of claim 21 wherein the control register is loaded with an auto-loop control parameter.

23. The apparatus of claim 21 wherein one p-event parameter defining register is loaded with a loop start address and another p-event parameter defining register is loaded with a loop end address generated by the addition of an EPLOOPIx immediate field with the loop start address.

24. The apparatus of claim 21 wherein an auto-loop count parameter is loaded in one p-event parameter defining register from an EPLOOPIx immediate field.

25. The apparatus of claim 14 wherein a plurality of eventpoint modules are chained together to chain a plurality of eventpoints.

26. An instruction eventpoint module comprising:
a plurality of control registers, each control register comprising a plurality of instruction eventpoint control bits for each eventpoint, each control resister storing a specified different type generalized event detection (p-event) and action (p-action) pair, the p-action to be taken in response to p-event detection;
a plurality of eventpoint registers including a plurality of p-event parameter registers storing parameters depending on the specified p-event;
eventpoint decode and control logic interpreting the plurality of instruction eventpoint control bits and generating a signal for the specified p-action; and
interface connections connecting the plurality of eventpoint registers, the plurality of control registers and the eventpoint decode and control logic.

27. The apparatus of claim 26 wherein said interface connections include a programmable load path for parameter initialization, signalling paths for compare detection tests as specified by the control register, and signalling paths for processor and direct memory access (DMA) state control.

28. The apparatus of claim 27 wherein the DMA state control initiates and controls background DMA operations while the processor continues running programs.

29. The apparatus of claim 26 wherein said plurality of p-event parameter registers comprises three eventpoint parameter registers used for detecting instruction events and generating corresponding actions and each eventpoint has a control byte that specifies how the three eventpoint registers are used.

30. The instruction eventpoint module of claim 26 wherein the eventpoint decode and control logic is connected to receive an input trigger signal from a predecessor eventpoint and to generate an output trigger signal connected to a successor eventpoint.

31. The instruction eventpoint module of claim 29 wherein each control byte includes a control code field and a signal bit used to control output signal generation, a pass-through control bit to control eventpoint chaining, and a trigger function bit which in conjunction with the control code field is used to control the use of an InTrigger signal or an eventpoint enabling signal.

* * * * *